US012265264B2

(12) United States Patent
Gibbs et al.

(10) Patent No.: US 12,265,264 B2
(45) Date of Patent: Apr. 1, 2025

(54) FIBER OPTIC ADAPTERS CONVERTIBLE BETWEEN DIFFERENT POLARITY TYPES

(71) Applicant: COMMSCOPE TECHNOLOGIES LLC, Hickory, NC (US)

(72) Inventors: Gary Federico Gibbs, Wylie, TX (US); Guilibaldo Ruiz, McKinney, TX (US); Bradley Scott Billman, Sachse, TX (US); Ronald L Mudd, Sachse, TX (US); Yang (Sunny) Xu, Frisco, TX (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 451 days.

(21) Appl. No.: 17/630,412

(22) PCT Filed: Jul. 23, 2020

(86) PCT No.: PCT/US2020/043312
§ 371 (c)(1),
(2) Date: Jan. 26, 2022

(87) PCT Pub. No.: WO2021/021575
PCT Pub. Date: Feb. 4, 2021

(65) Prior Publication Data
US 2022/0283381 A1   Sep. 8, 2022

Related U.S. Application Data

(60) Provisional application No. 62/879,232, filed on Jul. 26, 2019.

(51) Int. Cl.
G02B 6/38        (2006.01)

(52) U.S. Cl.
CPC .......... *G02B 6/3825* (2013.01); *G02B 6/3849* (2013.01)

(58) Field of Classification Search
CPC ....................................................... G02B 6/38
USPC ............................................................ 385/139
See application file for complete search history.

(56) References Cited

U.S. PATENT DOCUMENTS

| 4,712,861 A | 12/1987 | Lukas et al. |
| 4,775,327 A | 10/1988 | Normann et al. |
| 4,779,950 A | 10/1988 | Williams |
| 5,348,487 A | 9/1994 | Marazzi et al. |
| 5,363,460 A | 11/1994 | Marazzi et al. |

(Continued)

FOREIGN PATENT DOCUMENTS

| CN | 103018843 | 4/2013 |
| CN | 103018844 | 4/2013 |

(Continued)

OTHER PUBLICATIONS

International Search Report and Written Opinion of the International Searching Authority for International Patent Application No. PCT/US2020/043312 mailed Nov. 9, 2020, 11 pages.

(Continued)

*Primary Examiner* — Kaveh C Kianni
(74) *Attorney, Agent, or Firm* — Merchant & Gould P.C.

(57) ABSTRACT

The present disclosure relates to fiber optic adapters that are convertible between different configurations corresponding to different polarity schemes. The present disclosure also relates to fiber optic adapters having internal shutters integrated within end caps.

7 Claims, 27 Drawing Sheets

(56) References Cited

U.S. PATENT DOCUMENTS

| | | |
|---|---|---|
| 5,372,515 A | 12/1994 | Miller et al. |
| 5,506,922 A | 4/1996 | Grois et al. |
| 5,570,445 A | 10/1996 | Chou et al. |
| 5,687,268 A * | 11/1997 | Stephenson .......... G02B 6/3849 385/73 |
| 5,708,745 A | 1/1998 | Yamaji et al. |
| 5,716,224 A | 2/1998 | Masuda et al. |
| 5,887,098 A * | 3/1999 | Ernst .................. G02B 6/3825 385/60 |
| 5,909,526 A | 6/1999 | Roth et al. |
| 5,956,444 A | 9/1999 | Duda et al. |
| 6,004,043 A | 12/1999 | Abendschein et al. |
| 6,041,155 A | 3/2000 | Anderson et al. |
| 6,076,973 A | 6/2000 | Lu |
| 6,079,881 A | 6/2000 | Roth |
| 6,081,647 A | 6/2000 | Roth et al. |
| 6,108,482 A | 8/2000 | Roth |
| 6,206,577 B1 * | 3/2001 | Hall, III .............. G02B 6/3825 439/138 |
| 6,240,229 B1 | 5/2001 | Roth |
| 6,247,849 B1 | 6/2001 | Liu |
| 6,332,781 B1 | 12/2001 | Ito |
| 6,371,657 B1 | 4/2002 | Chen et al. |
| 6,425,694 B1 | 7/2002 | Szilagyi et al. |
| 6,461,054 B1 | 10/2002 | Iwase |
| 6,471,412 B1 | 10/2002 | Belenkiy et al. |
| 6,572,274 B1 | 6/2003 | Margaliot et al. |
| 6,595,696 B1 * | 7/2003 | Zellak .................. G02B 6/3825 439/138 |
| 6,652,155 B2 | 11/2003 | Lampert |
| 6,685,362 B2 | 2/2004 | Burkholder et al. |
| 6,688,780 B2 * | 2/2004 | Duran .................. G02B 6/3825 385/76 |
| 6,688,781 B2 | 2/2004 | Anderson et al. |
| 6,715,930 B2 * | 4/2004 | McBride .............. G02B 6/3825 385/73 |
| 6,866,424 B2 * | 3/2005 | Tanaka ................ G02B 6/4277 385/55 |
| 7,093,983 B2 | 8/2006 | Taira et al. |
| 7,182,524 B2 * | 2/2007 | Kramer ................ G02B 6/3825 385/60 |
| 7,261,472 B2 | 8/2007 | Suzuki et al. |
| 7,340,146 B2 * | 3/2008 | Lampert .............. G02B 6/3849 385/139 |
| 7,561,775 B2 | 7/2009 | Lin et al. |
| 7,648,286 B2 * | 1/2010 | Nakagawa .......... G02B 6/4261 385/92 |
| 7,661,887 B2 * | 2/2010 | Nakagawa .......... G02B 6/4296 385/92 |
| 7,676,133 B2 | 3/2010 | Lampert et al. |
| 7,703,987 B2 | 4/2010 | Kramer et al. |
| 7,785,018 B2 | 8/2010 | Jones et al. |
| 7,837,395 B2 | 11/2010 | Lin et al. |
| 7,841,777 B2 | 11/2010 | Howard et al. |
| 8,348,517 B2 | 1/2013 | Mudd et al. |
| 8,491,198 B2 | 7/2013 | Lin |
| 8,632,258 B2 | 1/2014 | Jibiki et al. |
| 8,676,022 B2 | 3/2014 | Jones |
| 8,690,459 B2 | 4/2014 | Lin et al. |
| 8,708,574 B2 | 4/2014 | Wang et al. |
| 8,770,856 B2 | 7/2014 | Lin et al. |
| 8,807,845 B2 | 8/2014 | Lin |
| 8,821,031 B2 * | 9/2014 | Lin ...................... G02B 6/3849 385/59 |
| 9,151,908 B2 | 10/2015 | Yoshizaki |
| 9,244,228 B2 | 1/2016 | Lin |
| 9,279,940 B2 | 3/2016 | Mayima et al. |
| 9,366,827 B2 | 6/2016 | Taira et al. |
| 9,453,963 B2 * | 9/2016 | Sato .................... G02B 6/241 |
| 9,494,746 B2 | 11/2016 | Sanders et al. |
| 9,618,715 B1 | 4/2017 | Yang et al. |
| 9,671,568 B2 * | 6/2017 | Yoshizaki ............ G02B 6/3849 |
| 9,933,586 B1 * | 4/2018 | Yang ................... G02B 6/3825 |
| 10,001,605 B2 * | 6/2018 | Gurreri ................ G02B 6/3865 |
| 10,012,799 B2 | 7/2018 | Sanders et al. |
| 10,067,296 B2 | 9/2018 | Kanno |
| 10,101,539 B2 | 10/2018 | Yang et al. |
| 10,416,392 B2 | 9/2019 | Hsu et al. |
| 10,451,812 B2 | 10/2019 | Verheyden |
| 10,502,903 B1 * | 12/2019 | Wang .................. G02B 6/3893 |
| 10,502,904 B2 * | 12/2019 | Yang ................... G02B 6/3825 |
| 11,609,384 B2 * | 3/2023 | Milchtein Peltsverger ................. G02B 6/3893 |
| 2003/0081913 A1 | 5/2003 | Zhu et al. |
| 2003/0147597 A1 * | 8/2003 | Duran .................. G02B 6/3849 385/76 |
| 2003/0180005 A1 * | 9/2003 | McBride .............. G02B 6/3825 385/73 |
| 2004/0062486 A1 * | 4/2004 | Tanaka ................ G02B 6/3849 385/55 |
| 2004/0081419 A1 | 4/2004 | Takeda et al. |
| 2004/0141693 A1 | 7/2004 | Szilagyi et al. |
| 2005/0286833 A1 * | 12/2005 | Kramer ................ G02B 6/3825 385/53 |
| 2006/0204200 A1 * | 9/2006 | Lampert .............. G02B 6/3849 385/139 |
| 2007/0230874 A1 | 10/2007 | Lin |
| 2008/0267566 A1 | 10/2008 | En Lin |
| 2008/0317414 A1 * | 12/2008 | Nakagawa .......... G02B 6/4261 385/76 |
| 2009/0003772 A1 | 1/2009 | Lu et al. |
| 2009/0028507 A1 | 1/2009 | Jones et al. |
| 2013/0272671 A1 * | 10/2013 | Jones .................. G02B 6/3849 385/139 |
| 2017/0285268 A1 | 10/2017 | Veatch et al. |
| 2018/0149813 A1 * | 5/2018 | Yang ................... G02B 6/3825 |
| 2018/0329153 A1 | 11/2018 | Verheyden |
| 2019/0137695 A1 | 5/2019 | Good |
| 2020/0174199 A1 * | 6/2020 | Wong .................. G02B 6/406 |
| 2021/0349268 A1 | 11/2021 | Lei et al. |
| 2022/0221653 A1 * | 7/2022 | Poe .................... G02B 6/3849 |
| 2024/0142714 A1 * | 5/2024 | Wong .................. G02B 6/3825 |
| 2024/0219670 A1 * | 7/2024 | Poe .................... G02B 6/44528 |

FOREIGN PATENT DOCUMENTS

| | | |
|---|---|---|
| CN | 104903766 | 9/2015 |
| CN | 108919430 A | 11/2018 |
| CN | 108957643 | 12/2018 |
| EP | 1 139 128 A2 | 4/2001 |
| EP | 3376271 | 9/2018 |
| JP | 2005017598 | 1/2005 |
| JP | 2006106635 A * | 4/2006 |
| JP | 2013007841 | 1/2013 |
| KR | 970062736 | 9/1997 |
| KR | 10-2018-0069121 A | 6/2018 |
| WO | 2019/060293 | 3/2019 |
| WO | 2019/143786 | 7/2019 |

OTHER PUBLICATIONS

PCT International Preliminary Report on Patentability in International Application PCT/US2020/043312, mailed Feb. 10, 2022, 9 pages.

Extended European Search Report for Application No. 20847728.1 mailed Jul. 7, 2023.

* cited by examiner

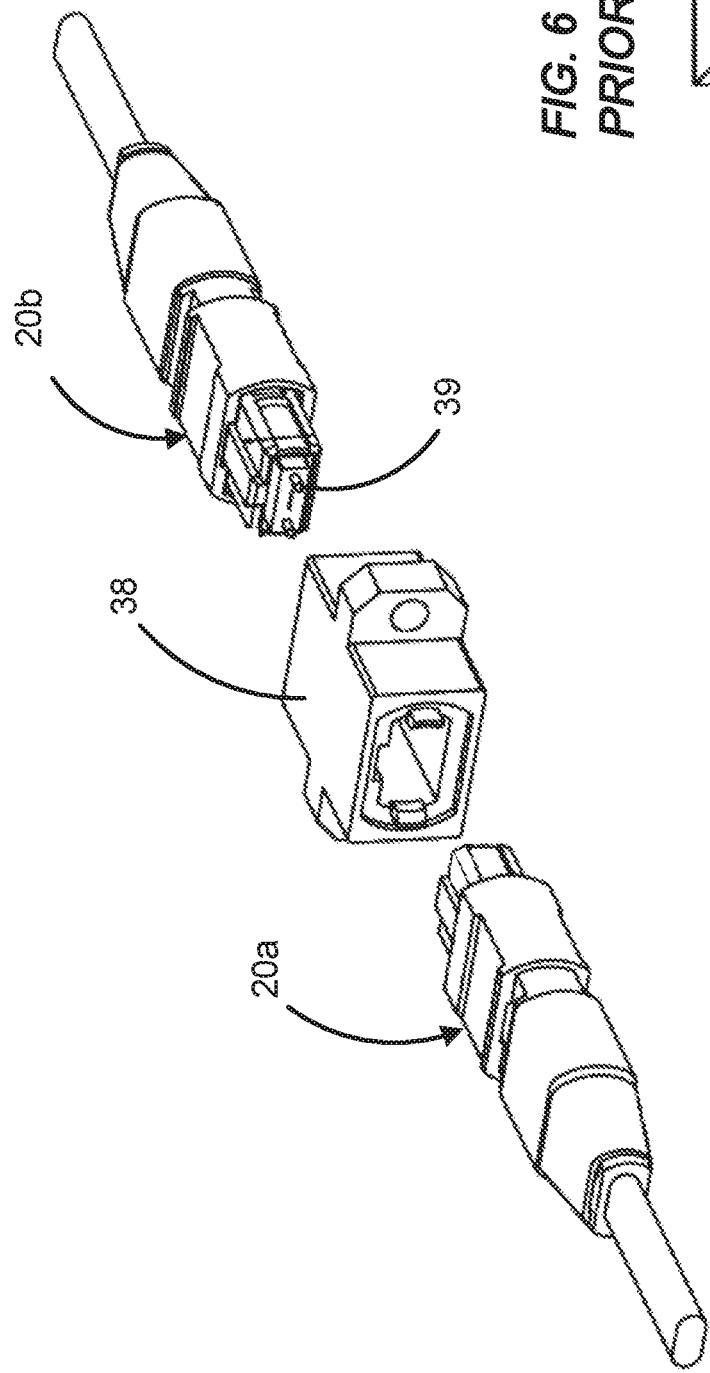
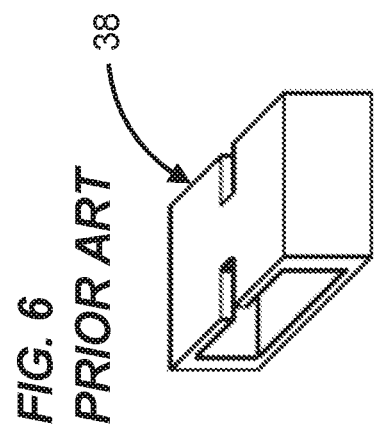
FIG. 5 PRIOR ART
FIG. 6 PRIOR ART

FIBER OPTIC ADAPTERS CONVERTIBLE BETWEEN DIFFERENT POLARITY TYPES

CROSS-REFERENCE TO RELATED APPLICATION

This application is a National Stage Application of PCT/US2020/043312, filed on Jul. 23, 2020, which claims the benefit of U.S. Patent Application Ser. No. 62/879,232, filed on Jul. 26, 2019, the disclosures of which are incorporated herein by reference in their entireties. To the extent appropriate, a claim of priority is made to each of the above disclosed applications.

BACKGROUND

In a fiber optic system, polarity relates to maintaining a direction of signal travel throughout the length a given optical fiber path (e.g., fiber link, optical transmission path). In many multi-fiber optical systems, it is important to manage polarity so that a continuous optical fiber path is provided between two desired end locations. For example, for common applications, it is crucial for a given optical fiber path to extend from a given transmitter at one end of the optical fiber path to a given receiver at an opposite end of the optical fiber path. Maintaining proper polarity can be difficult because a typical optical system has an architecture that includes multi-fiber cables coupled together end-to-end by multi-fiber connectors to form the optical fiber paths. If the multi-fiber cables are not constructed or coupled together in a way in which proper polarity is maintained, the optical fiber paths will not couple to the desired end points. To assist the industry in selecting and installing the appropriate components (e.g., multi-fiber optical cables, multi-fiber optical connectors, multi-fiber optical adapters, fiber optic equipment) in the appropriate configurations to maintain proper polarity, industry installation standards have been established. Example polarity methods established by the telecommunications industry for MPO connectivity include Method A, Method B and Method C.

Architectures employing MPO connectivity utilize MPO connectors, multi-fiber cables having ends terminated by MPO connectors, and MPO adapters for coupling two MPO connectors together. FIG. 1 depicts a typical MPO connector 20 including an MPO ferrule 22 mounted at the end of an MPO connector body 24. A release sleeve 26 for releasing the MPO connector 20 from an MPO adapter is mounted on the MPO connector body 24. The MPO connector body 24 includes a key 28. The MPO ferrule 22 defines a row of twelve fiber openings 30 in which optical fibers are secured. The fiber openings 30 have been assigned fiber positions by the telecommunications industry. For example, when the MPO connector 20 is viewed with the key 28 up as shown at FIG. 1, the fiber openings 30 define fiber positions 1-12 numbered consecutively from left to right.

Components for supporting Method A, Method B and Method C polarity management architectures can have different configurations. For example, FIGS. 2-4 respectively show a Type-A cord 32 used primarily for Method A applications, a Type-B cord 33 used primarily for Method B applications and a Type-C cord 34 used primarily for Method C applications. The cords 32-34 each have MPO connectors at each end and twelve optical fibers routed through the cords and terminated at the MPO connectors. In the Type-A cord 32, the optical fibers are not laterally transposed such that the ends of each optical fiber are secured at the same position at each of the MPO connectors. As depicted at FIG. 2, one of the MPO connectors is key up, the other MPO connector is key down, and the optical fibers are routed straight between the MPO connectors. In the Type-B cord 33, the optical fibers are laterally transposed such that the ends of each optical fiber are secured at opposite lateral positions at each of the MPO connectors. As depicted at FIG. 3, the MPO connectors are both key up, and the optical fibers are routed straight between the MPO connectors. Thus, the optical fibers respectively are connected between fiber positions: 1 and 12; 2 and 11; 3 and 10; 4 and 9; 5 and 8; 6 and 7; 7 and 6; 8 and 5; 9 and 4; 10 and 3; 11 and 2; and 12 and 1. The Type-C cord, shown at FIGS. 4 and 4A, has pair-wise flipping/transposition of the optical fibers so the optical fibers are respectively coupled between fiber positions: 1 and 2; 2 and 1; 3 and 4; 4 and 3; 5 and 6; 6 and 5; 7 and 8; 8 and 7; 9 and 10; 10 and 9; 11 and 12; and 12 and 11.

MPO fiber optic adapters are used to couple two MPO connectors together. The MPO fiber optic adapters include latches for retaining the MPO connectors within ports of the MPO adapters. The release sleeves 26 of the MPO connectors are pulled-back relative to the MPO connector bodies 24 to release the MPO connectors from the ports. MPO adapters can have a Type-B configuration (see FIG. 5 showing MPO connectors 20a, 20b aligned with a Type B adapter 38 as also shown at FIG. 6) for Method B applications and a Type-A configuration (see FIG. 7 showing MPO connectors 20a, 20b aligned with a Type A adapter 36 as also shown at FIG. 8) for Method B applications. The Type A adapter 36 has a key-up to key-down configuration for orienting the MPO connectors 20a, 20b so that the fiber positions of the MPO connectors 20a, 20b are not laterally transposed. In contrast, the Type B adapter 38 has a key-up to key-up configuration for orienting the MPO connectors 20a, 20b so that the fiber positions of the MPO connectors 20a, 20b are laterally transposed.

MPO connectors can either be female or male. A male MPO connector has alignment pins 39 that protrude from the MPO ferrule (e.g., see MPO connector 20b) while a female MPO connector has openings in the MPO ferrule for receiving the pins 39 of the male MPO connector to provide alignment between the male and female MPO connectors when the MPO connectors are coupled together.

MPO connectors can include MPO ferrules with end faces that are perpendicular relative to the axes of the optical fibers supported by the ferrules. As used herein, this type of end face is referred to as a perpendicular end face and is typically used with multi-mode optical fibers. This type of end face can also be referred to as a flat end face. MPO connectors can also include MPO ferrules with end faces that are obliquely angled relative to the axes of the optical fibers supported by the ferrules. As used herein, this type of end face is referred to as an obliquely angled end face and is typically used with single mode optical fibers. This type of end face can also be referred to as an angled end face. Generally, obliquely angled end faces are angled about 8 degrees relative to perpendicular with respect to the axes of the optical fibers supported by the ferrule. Obliquely angled end faces can be oriented to face toward the MPO connector key (typically called an "angled-up" configuration) or can be oriented to face away from the MPO connector key (typically called an "angled-down" configuration).

SUMMARY

Aspects of the present disclosure relate to fiber optic adapters that are convertible between different configurations corresponding to different polarity schemes. In one example, the fiber optic adapters can be converted between Type A fiber optic adapters and Type B fiber optic adapters.

Other aspects of the present disclosure relate to fiber optic adapters having internal shutter configurations. In certain examples, the internal shutter configurations are compatible with fiber optic adapters that can be converted between configurations corresponding to different polarity schemes.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 5 depicts a prior art Type B adapter with corresponding MPO fiber optic connectors aligned therewith;
FIG. 6 is a schematic view of the prior art Type B adapter of FIG. 5.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
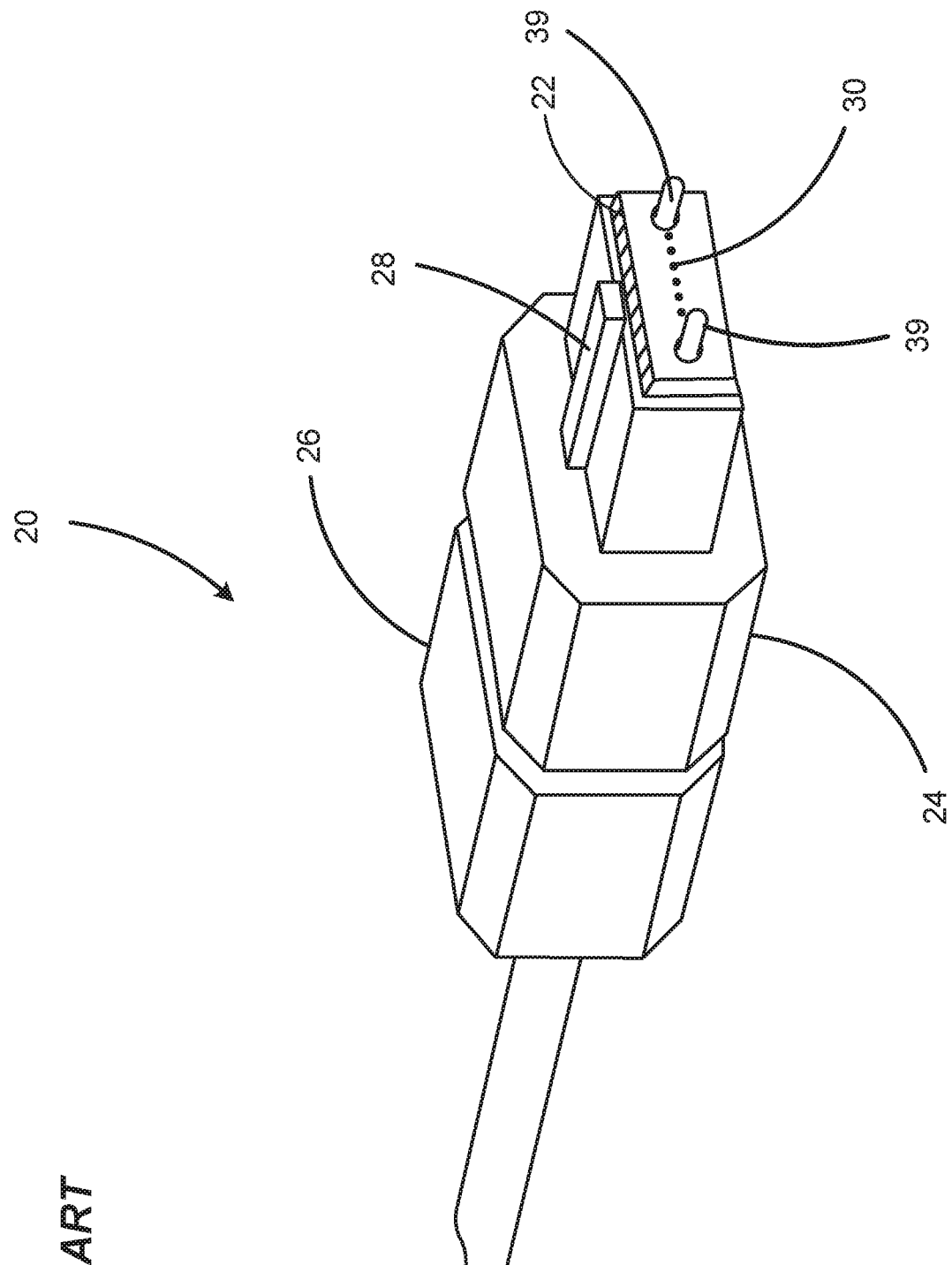
FIG. 1 schematically depicts a prior art MPO ferrule.
Figure 2:
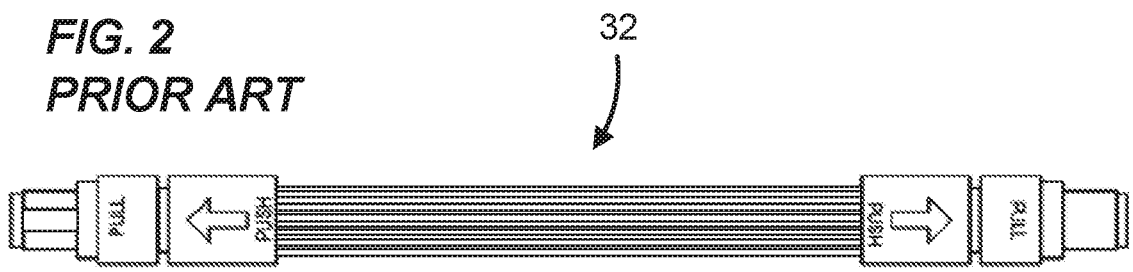
FIG. 2 depicts a prior art Type A patch cord assembly.
Figure 3:
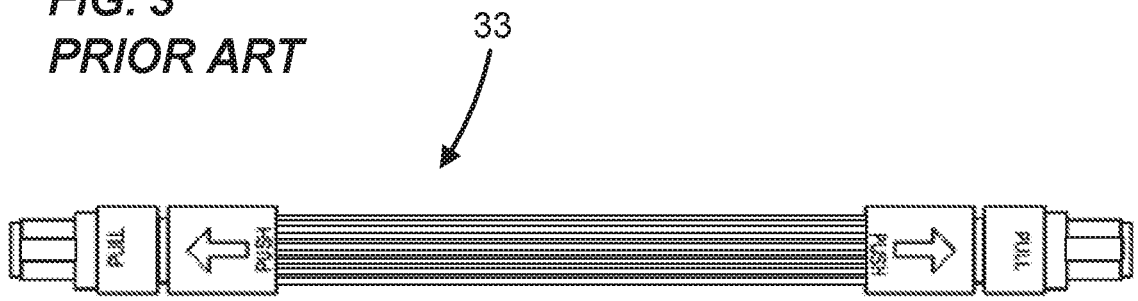
FIG. 3 depicts a prior art Type B patch cord assembly.
Figure 4:
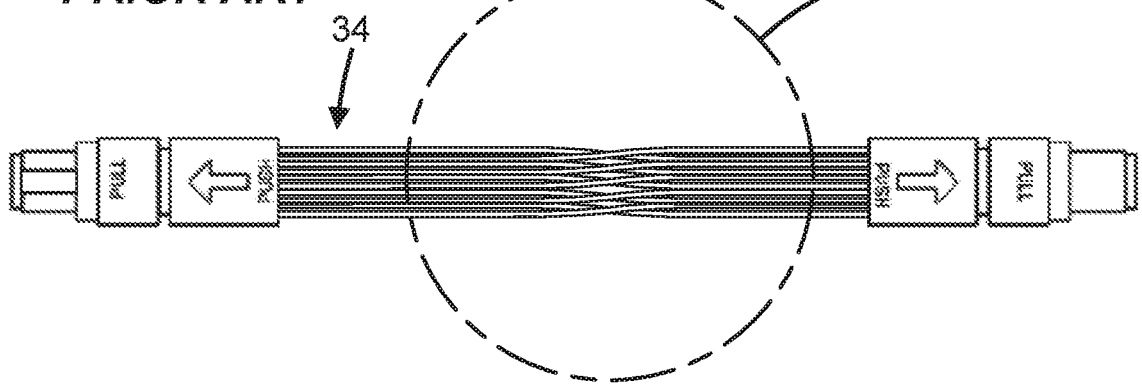
FIG. 4 depicts a prior art Type C patch cord assembly.
Figure 4A:
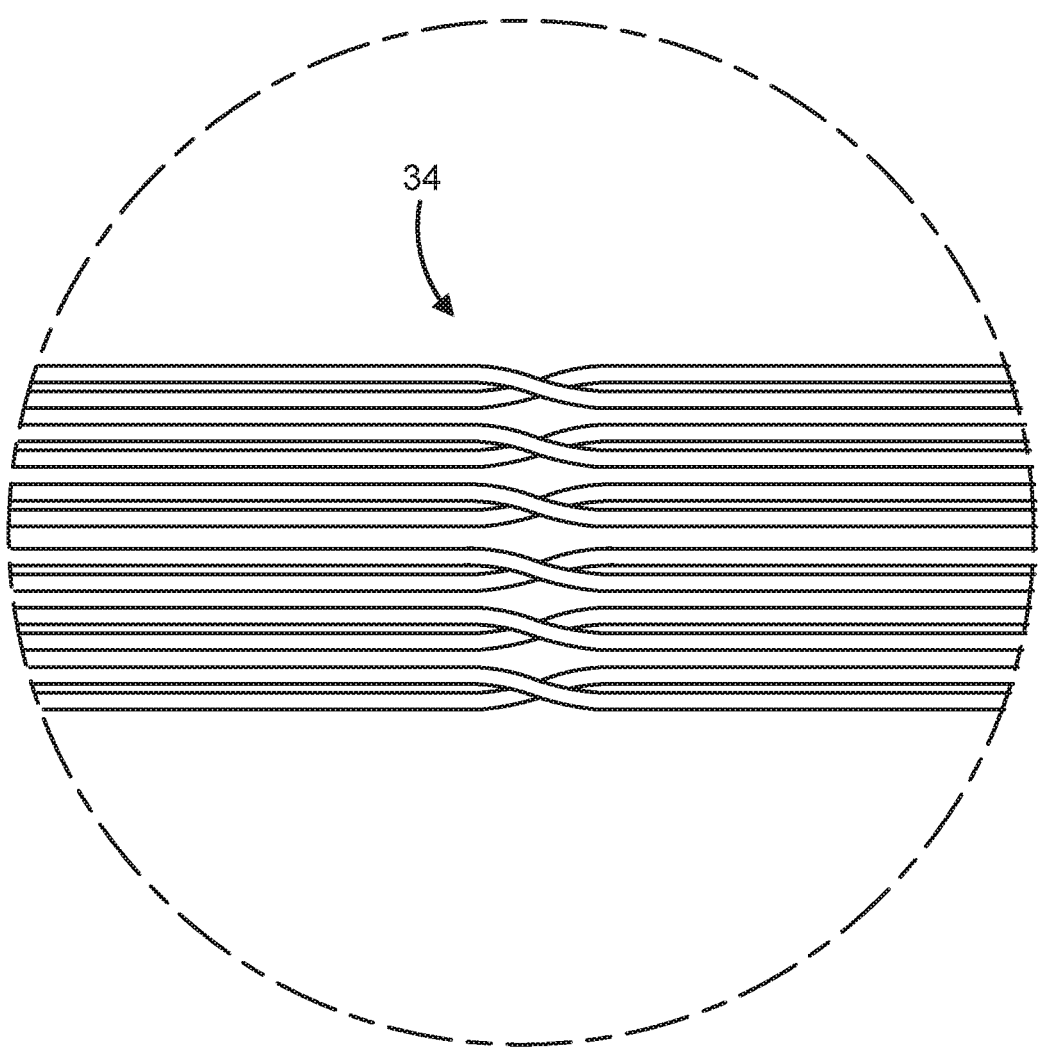
FIG. 4A is an enlarged view of a portion of FIG. 4 showing pair-wise fiber crossovers.
Figure 8:
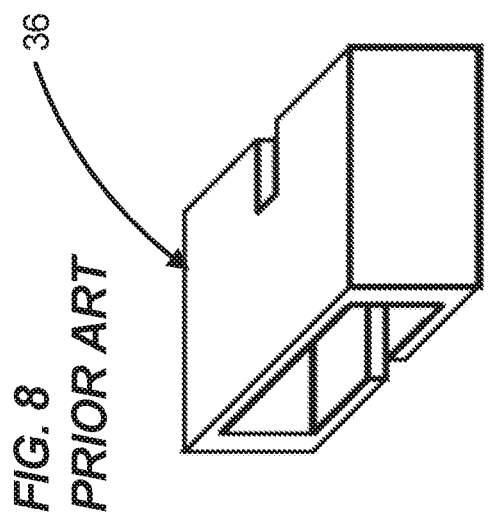
FIG. 8 is a schematic view of the prior art Type A fiber optic adapter of FIG. 7.
Figure 7:
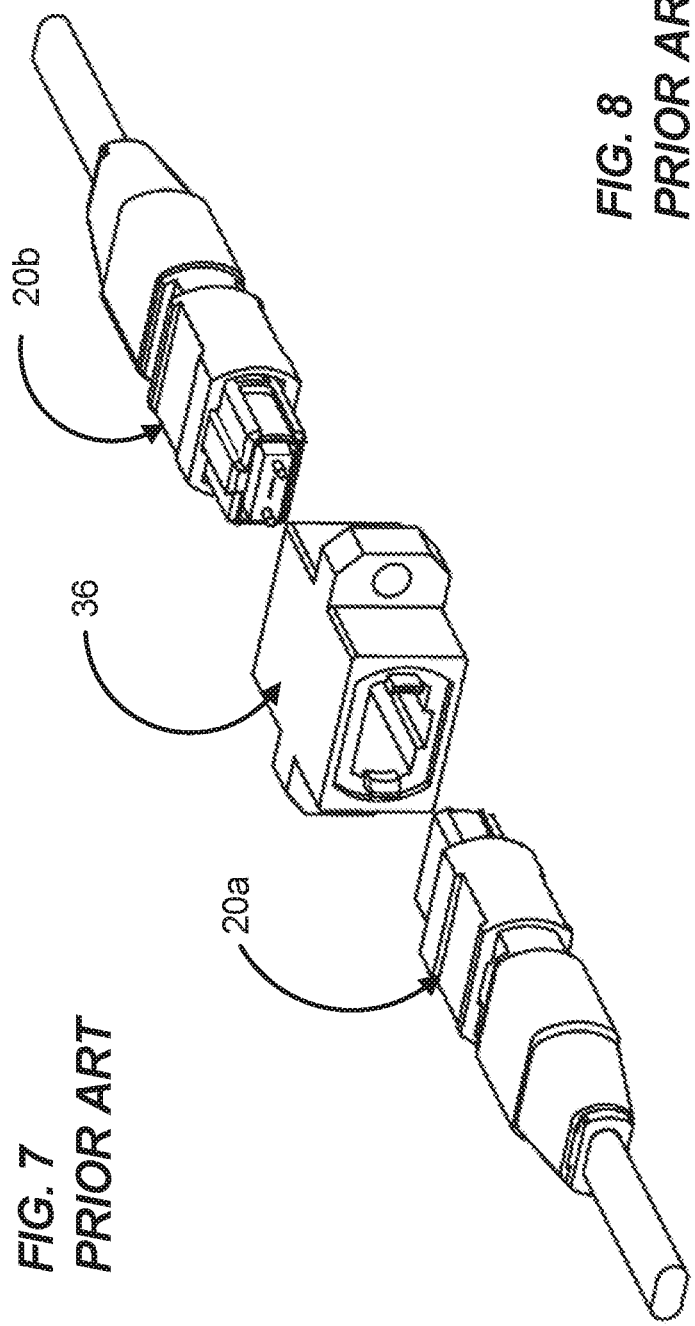
FIG. 7 depicts a prior art Type A fiber optic adapter with corresponding MPO fiber optic connectors aligned therewith.
Figure 9:
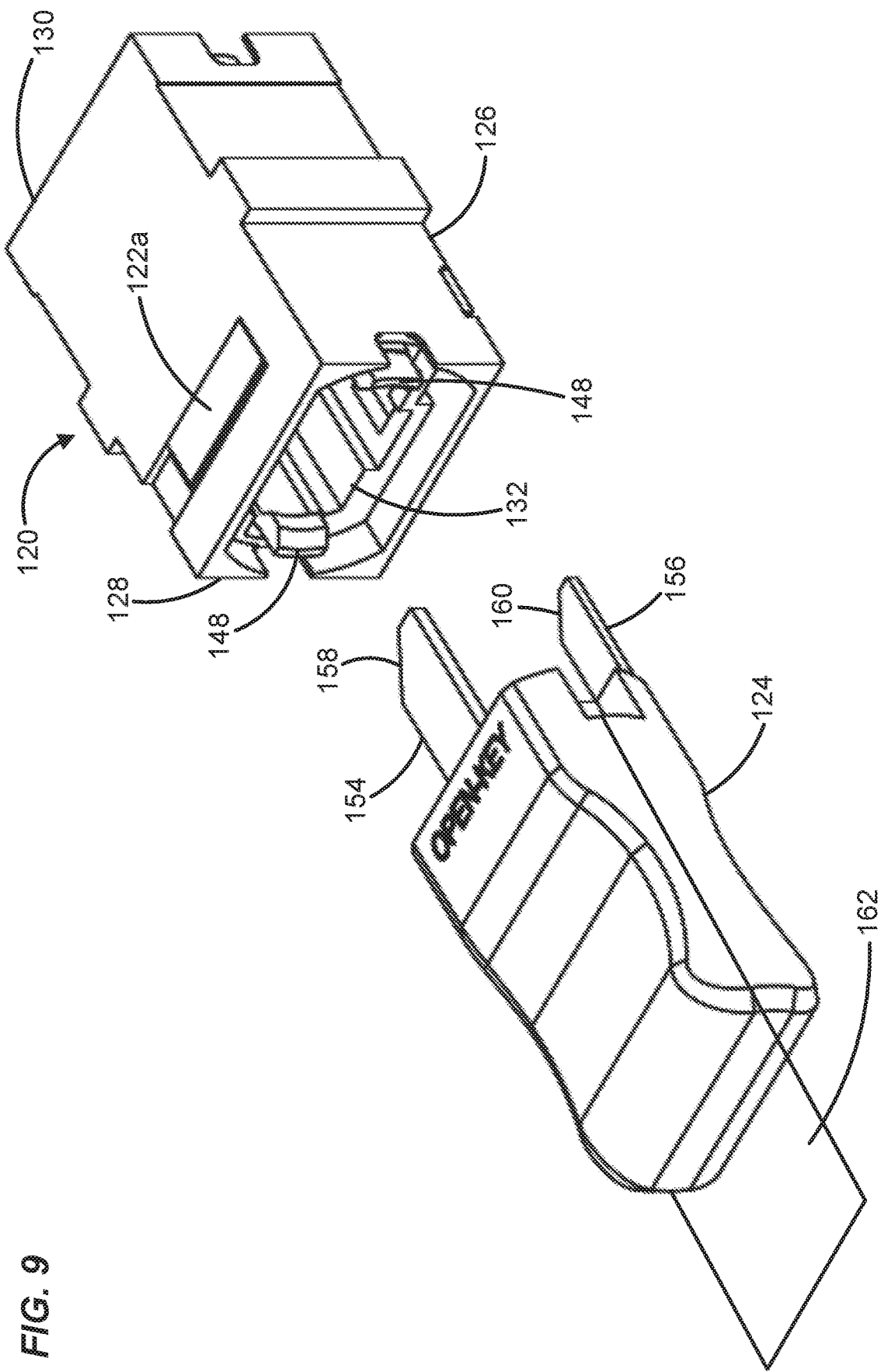
FIG. 9 is a perspective view depicting a fiber optic adapter in accordance with the principles of the present disclosure that can be converted between different configurations corresponding to different polarity schemes, a tool for switching the fiber optic adapter between the different configurations is also depicted.
Figure 10:
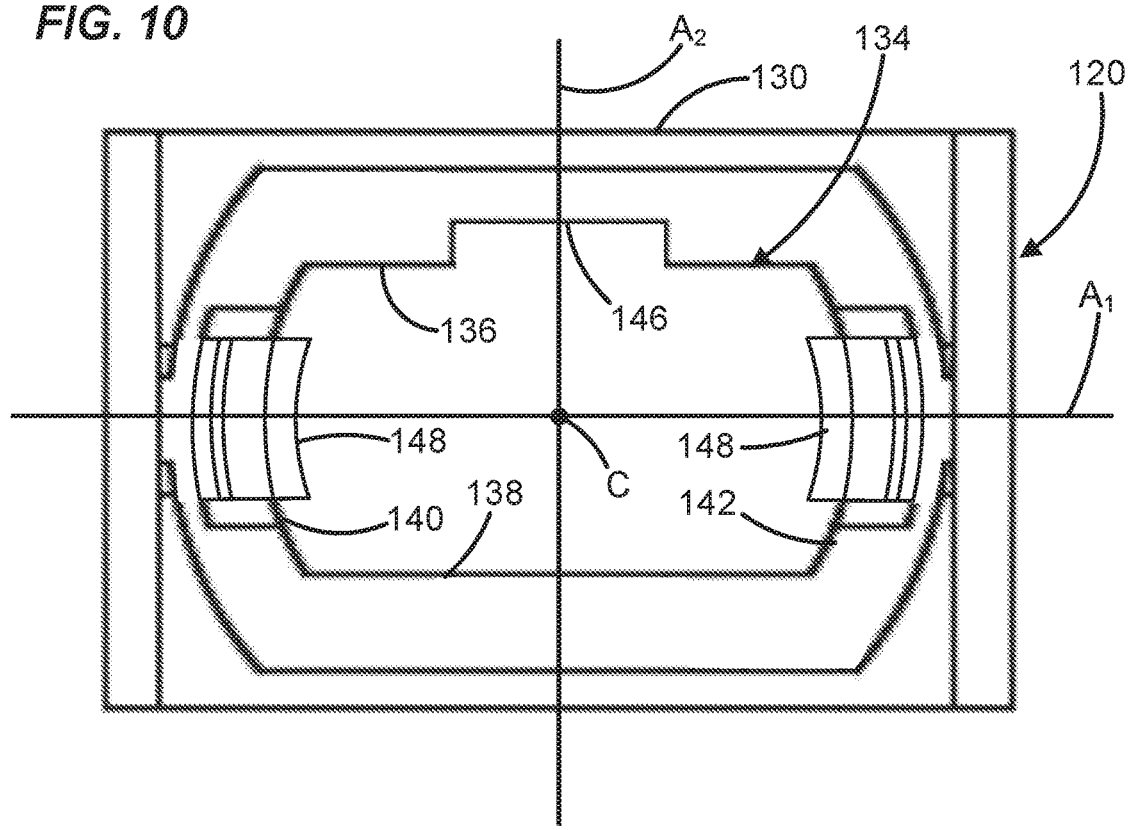
FIG. 10 is an end view showing the back end of the fiber optic adapter of FIG. 9.
Figure 11:
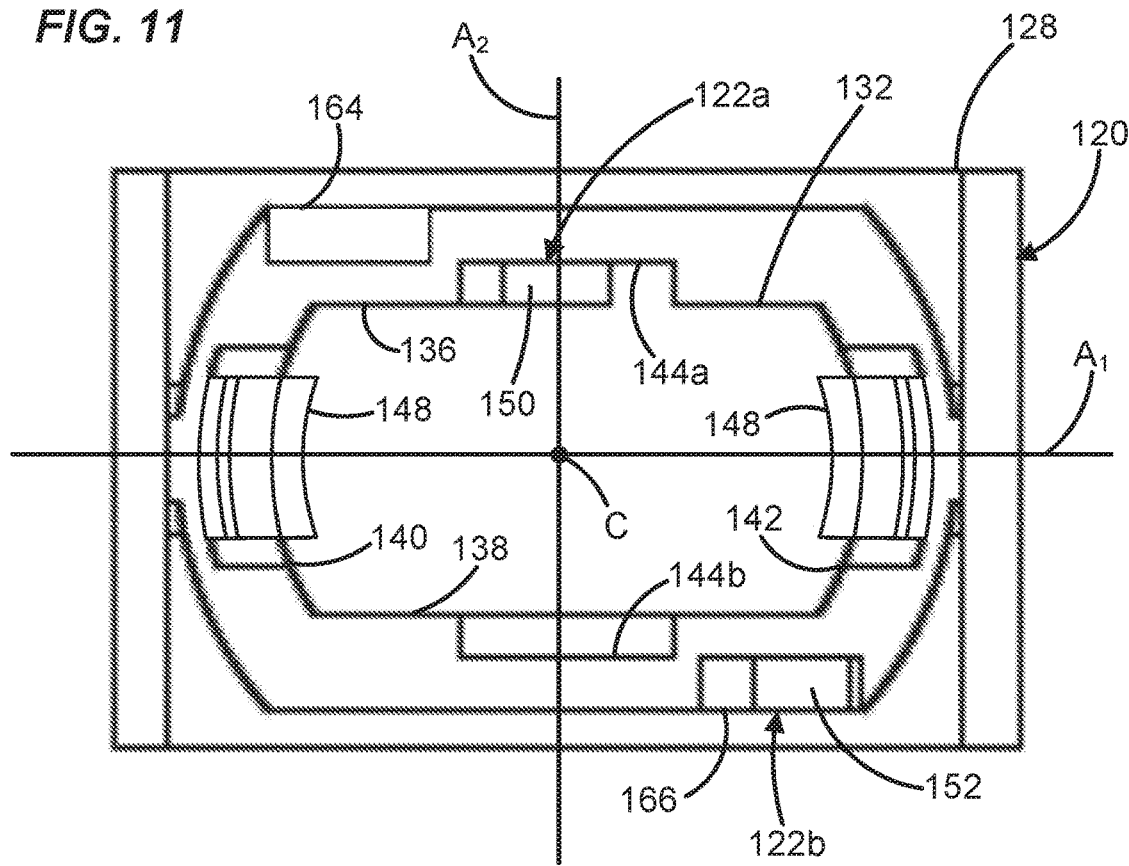
FIG. 11 is an end view showing the front end of the fiber optic adapter of FIG. 9 with an upper keyway in a blocked configuration and a lower keyway in an open configuration.
Figure 12:
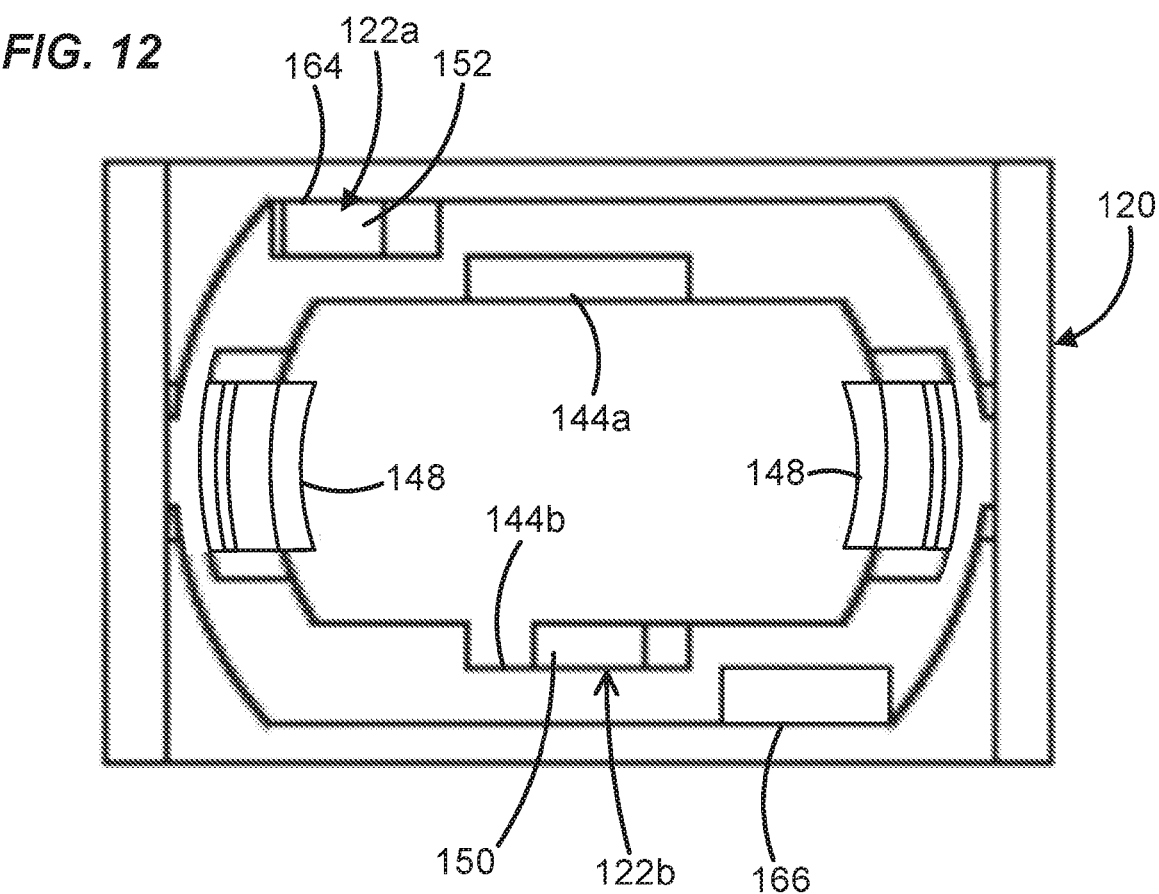
FIG. 12 is an end view showing the front end of the fiber optic adapter of FIG. 9 with the upper keyway open and the lower keyway blocked.

FIGS. 9-16 depict a fiber optic adapter 120 in accordance with the principles of the present disclosure. The fiber optic adapter 120 is preferably configured for coupling together two fiber optic connectors. In certain examples, the fiber optic connectors can be multi-fiber fiber optic connectors such as MPO fiber optic connectors. The fiber optic adapter 120 includes first and second slide blockers 122a, 122b that can be moved to convert the fiber optic adapter 120 between different configurations corresponding to different polarity schemes. For example, FIG. 11 shows the fiber optic adapter 120 configured as a Type A fiber optic adapter, while FIG. 12 shows the fiber optic adapter 120 configured as a Type B fiber optic adapter. As shown at FIG. 9, a tool 124 can be used to move the first and second slide blockers 122a, 122b to convert the fiber optic adapter 120 between the different configurations.

Referring to FIG. 9, the fiber optic adapter 120 includes an adapter body 126 including first and second opposite ends 128, 130. The first end 128 defines a first connector port 132 (see FIGS. 11 and 12) while the second end 130 defines a second connector port 134 (see FIG. 10). The first and second connector ports 132, 134 are aligned along a central axis C (see FIG. 9) that extends between the first and second ends 128, 130 of the adapter body 126 and through the first and second connector ports 132, 134. The first and second connector ports 132, 134 each define an oblong profile shape having perpendicular major and minor axes A1, A2 (see FIGS. 10 and 11). The oblong profile shape of each of the first and second connector ports 132, 134 has first and second major sides 136, 138 intersected by the minor axis A2 and first and second minor sides 140, 142 intersected by the major axis A1. The first connector port 132 includes first and second keyways 144a, 144b aligned along the minor axis A2 of the first connector port 132. The first and second keyways 144a, 144b are located respectively at the first and second major sides 136, 138 of the first connector port 132. The second connector port 134 defines a single keyway 146 (see FIG. 10) aligned along the minor axis A2 of the second connector port 134. The single keyway 146 is located at the first major side 136 of the second connector port 134 and is coaxially aligned with the first keyway 144a of the first connector port 132.

The fiber optic adapter 120 also includes connector retention latches 148 integrated with the adapter body 126 at the first and second connector ports 132, 134. The connector latches 148 of each of the first and second connector ports 132, 134 are located respectively at the first and second minor sides 140, 142 of the respective first or second connector port 132, 134. The connector retention latches 148 of each of the first and second connector ports 132, 134 are aligned along the major axis A1 of their respective first or second connector port 132, 134.

The first and second slide blockers 122a, 122b are respectively slideably mounted to the adapter body 126 adjacent the first and second major sides 136, 138 of the first connector port 132. The first and second slide blockers 122a, 122b are each slideably movable relative to the adapter body 126 between first and second positions. The first and second slide blockers 122a, 122b are each slideably moveable relative to the adapter body 126 in an orientation that extends along the major axis A1 of the first connector port 132. When the first slide blocker 122a is in the first position (see FIG. 11) the first slide blocker 122a at least partially obstructs the first keyway 144a such that the first keyway is in a key non-receiving configuration. When the first slide blocker 122a is in the second position (see FIG. 12), the first keyway 144a is in a key receiving configuration. When the second slide blocker 122b is in the first position (see FIG. 12), the second slide blocker 122b at least partially obstructs the second keyway 144b such that the second keyway 144b is in a key non-receiving configuration. When the second slide blocker 122b is in the second position (see FIG. 11), the second keyway 144b is in a key receiving configuration. It will be appreciated that by selectively opening or blocking the keyways 144a, 144b with the first and second slide blockers 122a, 122b, the fiber optic adapter 120 can be converted between a Type A configuration as shown at FIG. 11 and a Type B configuration as shown at FIG. 12.

It will be appreciated that the first slide blocker 122a moves toward the first minor side 140 of the first connector port 132 when moving from the first position (e.g., the blocking position) to the second position (e.g., the non-blocking position) and moves toward the second minor side 142 when moving from the second position to the first position. The second slide blocker 122b moves toward the second minor side 142 when moving from the first position (e.g., the blocking position) to the second position (e.g., the non-blocking position) and moves toward the first minor side 140 when moving from the second position to the first position.

Figure 13:
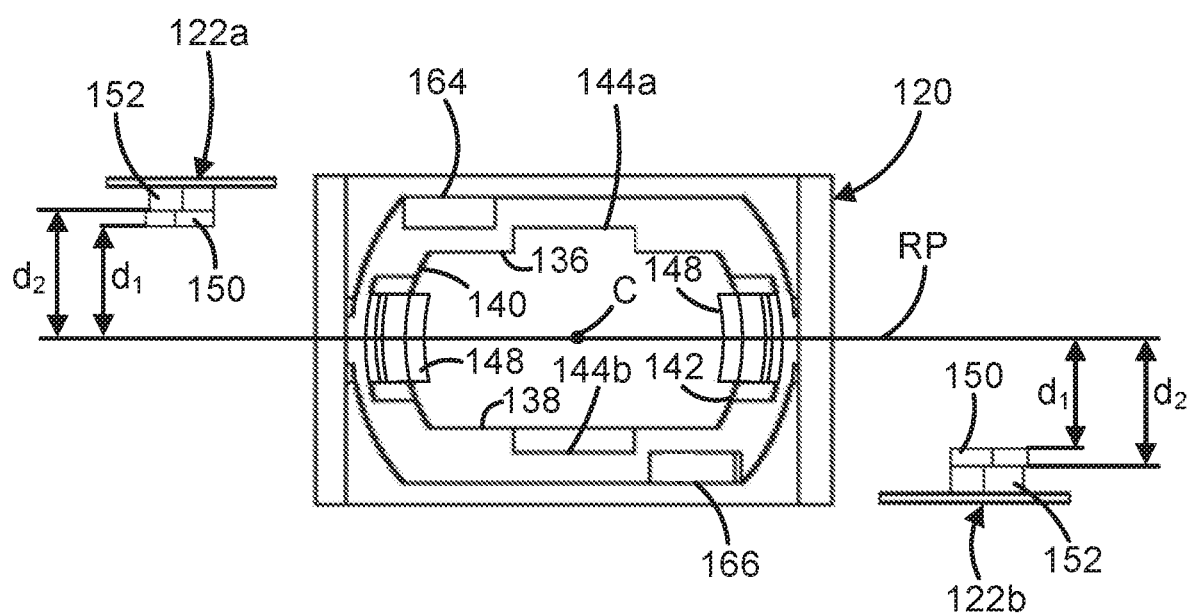
FIG. 13 is an end view of the front end of the fiber optic adapter of FIG. 9 with upper and lower keyway blockers of the fiber optic adapter laterally exploded from an adapter body of the fiber optic adapter.
Figure 15:
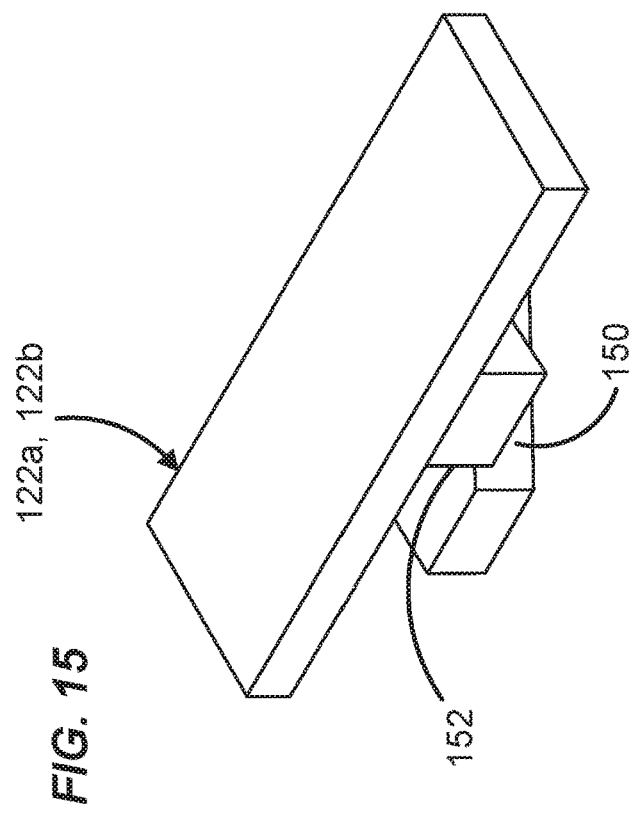
FIG. 15 is another perspective view of the keyway blocker of FIG. 14.
Figure 14:
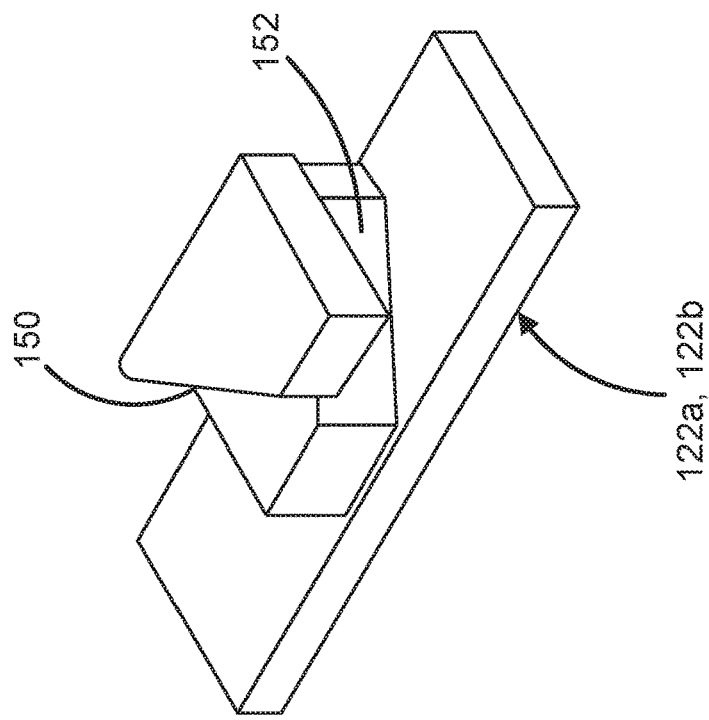
FIG. 14 is a perspective view of one of the keyway blockers of FIG. 13.

Referring to FIGS. 11-15, the first and second slide blockers 122a, 122b each include first and second blocker cam surfaces 150, 152 that face generally in opposite directions with respect to each other. The first and second slide blockers 122a, 122b are positioned such that the first blocker cam surface 150 of the first slide blocker 122a and the second blocker cam surface 152 of the second slide blocker 122b face in a direction toward the second minor side 142 of the first connector port. Also, the second blocker cam surface 152 of the first slide blocker 122a and the first blocker cam surface 150 of the second slide blocker 122b face toward the first minor side 140 of the first connector port 132. The first blocker cam surface 150 of the first slide blocker 122a and the second blocker cam surface 152 of the second slide blocker 122b angle toward the second minor side 142 of the first connector port 132 as they extend axially into the connector port 132. In contrast, the second blocker cam surface 152 of the first slide blocker 122*a* and the first blocker cam surface 150 of the second slide blocker 122*b* angle toward the first minor side 140 of the first connector port 132 as the cam surfaces extend axially into the connector port 132. As shown at FIG. 13, the first blocker cam surfaces 150 are offset a first distance d1 from a central reference plane RP and includes the minor axis A2 and the central axis C. The second blocker cam surfaces 152 are offset a second distance d2 from the central reference plane RP. Preferably, the first and second distances d1, d2 are not equal. In the depicted example, the first distance d1 is smaller than the second distance d2.

It will be appreciated that the first and second slide blockers 122*a*, 122*b* are configured to move in opposite directions with respect to one another when moving from the first position to the second position. Similarly, the first and second slide blockers 122*a*, 122*b* are configured to move in opposite directions relative to one another when moving from the second position to the first position.

Referring back to FIG. 9, the tool 124 is configured to: a) move the first slide blocker 122*a* from the first position to the second position and simultaneously move the second slide blocker 122*b* from the second position to the first position; and b) move the first slide blocker 122*a* from the second position to the first position and simultaneously move the second slide blocker 122*b* from the first position to the second position. The tool 124 includes first and second prongs 154, 156 with are preferably spaced apart from one another and parallel to one another. The first prong 154 includes a first tool cam surface 158 and the second prong 156 includes a second tool cam surface 160. The first prong 154 and the first tool cam surface 158 are offset the first distance D1 from a central reference plane 162 of the tool and the second prong 156 and the second tool cam surface 160 are offset the second distance D2 from the central reference plane 162 of the tool 124. The first and second prongs 154, 156 of the tool are configured to be inserted into the adapter body 126 of the fiber optic adapter 120 in a direction that extends along the central axis C to move the first and second slide blockers 122*a*, 122*b* between the first and second positions. To move the first slide blocker 122*a* from the first position to the second position and simultaneously move the second slide blocker 122*b* from the second position to the first position, the tool 124 is inserted into the fiber optic adapter 120 while at a first rotational position, during insertion, the first tool cam surface 158 engages the first blocker cam surface 150 of the first slide blocker 122*a* and the second tool cam surface 160 simultaneously engages the second blocker cam surface 152 of the second slide blocker 122*b* to cause simultaneous movement of the slide blockers 122*a*, 122*b*. To move the first slide blocker 122*a* from the second position to the first position and simultaneously move the second slide blocker 122*b* from the first position to the second position, the first and second prongs 154, 156 of the tool 124 are inserted into the fiber optic adapter 120 while the tool 124 is in a second rotational position that is rotated 180 degrees from the first rotational position. As the first and second prongs 154, 156 are inserted into the fiber optic adapter 120, the second tool cam surface 160 engages the second blocker cam surface 152 of the first slide blocker 122*a* and the first tool cam surface 158 engages the first blocker cam surface 150 of the second slide blocker 122*b* to cause simultaneous movement of the first and second slide blockers 122*a*, 122*b* in opposite directions.

The adapter body 126 defines first and second prong-receiving slots 164, 166 adjacent the first and second major sides 136, 138 of the first connector port 132. The first and second prong-receiving slots 164, 166 as well as the first and second keyways 144*a*, 144*b* are configured for receiving the first and second prongs 154, 156 of the tool 124. When the tool 124 is inserted into the fiber optic adapter 120 while in its first rotational orientation, the first prong 154 is inserted into the first keyway 144*a* and the second prong 156 is simultaneously inserted into the second prong-receiving slot 166 to move the first slide blocker 122*a* from the first position to the second position and simultaneously move the second slide blocker 122*b* from the second position to the first position. When the tool 124 is inserted into the fiber optic adapter 120 while in its second rotational orientation, the first prong 154 is inserted into the second keyway 144*b* and the second prong 156 is simultaneously inserted into the first prong-receiving slot 164 to move the first slide blocker from the second position to the first position and simultaneously move the second slide blocker 122*b* from the first position to the second position. The central reference plane 162 of the tool 124 aligns with the central reference plane RP of the adapter body 126 when the first and second prongs 154, 156 are inserted into the adapter body 126.

Figure 16:
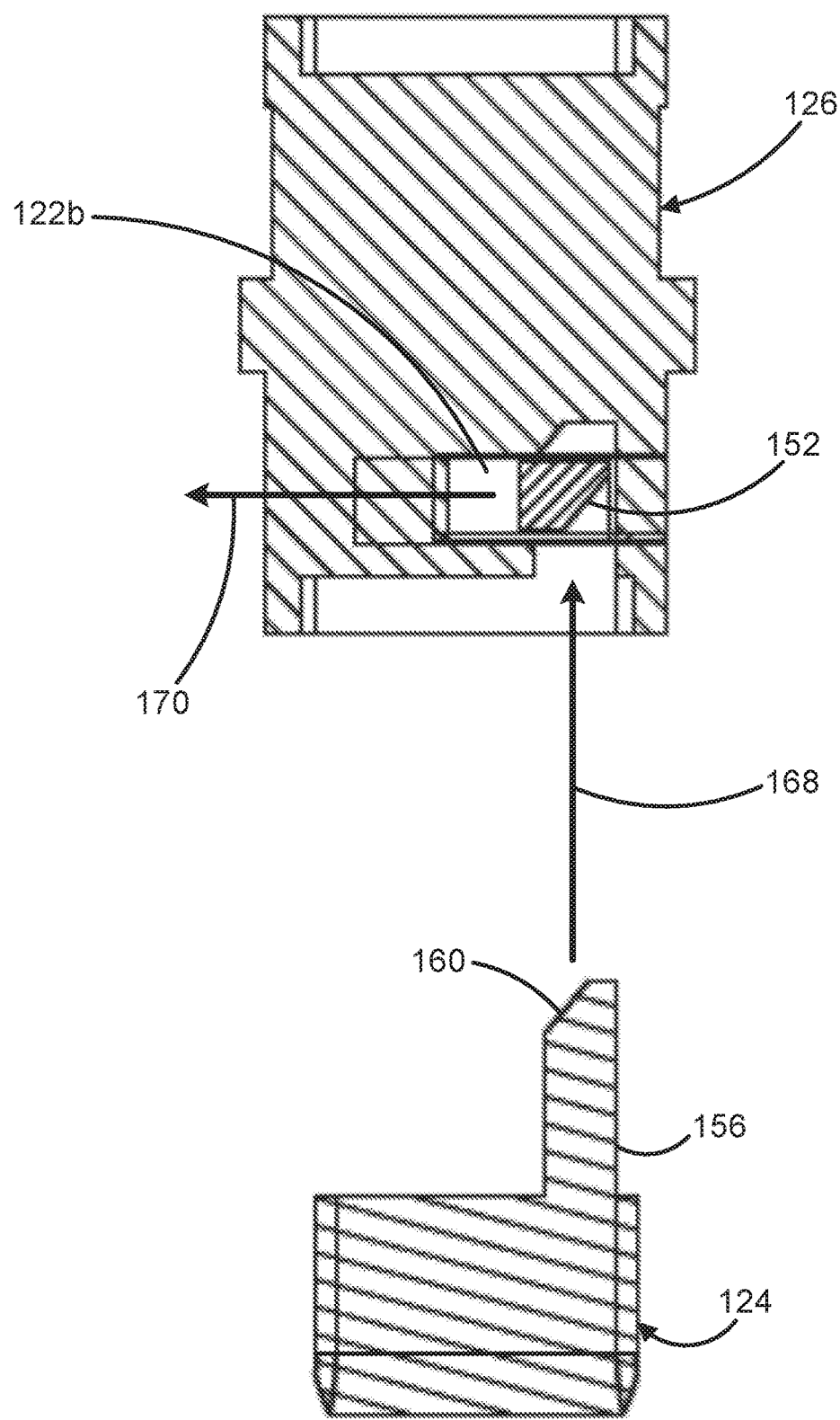
FIG. 16 is a schematic illustration showing how the tool of FIG. 9 is used to move the lower key blocker from the non-blocking position to the blocking position.

By way of example, FIG. 16 shows how axial movement of the tool 124 along axis C causes sliding movement of the first and second slide blockers 122*a*, 122*b* in an orientation perpendicular to the axis C. For example, as shown at FIG. 16, contact between the second tool cam surface 160 of the second prong 156 and the second blocker cam surface 152 of the second slide blocker 122*b* as the tool 124 is inserted axially along the direction 168 into the fiber optic adapter 120 provides a cam action that forces the second slide blocker 122*b* in a direction 170 perpendicular relative to the direction 168. It will be appreciated that the interaction between the cam surfaces 158, 160 of the tool 124 and the other blocker cam surfaces 150, 152 operate in a similar manner to cause movement of the slide blockers 122*a*, 122*b*.

Figure 19:
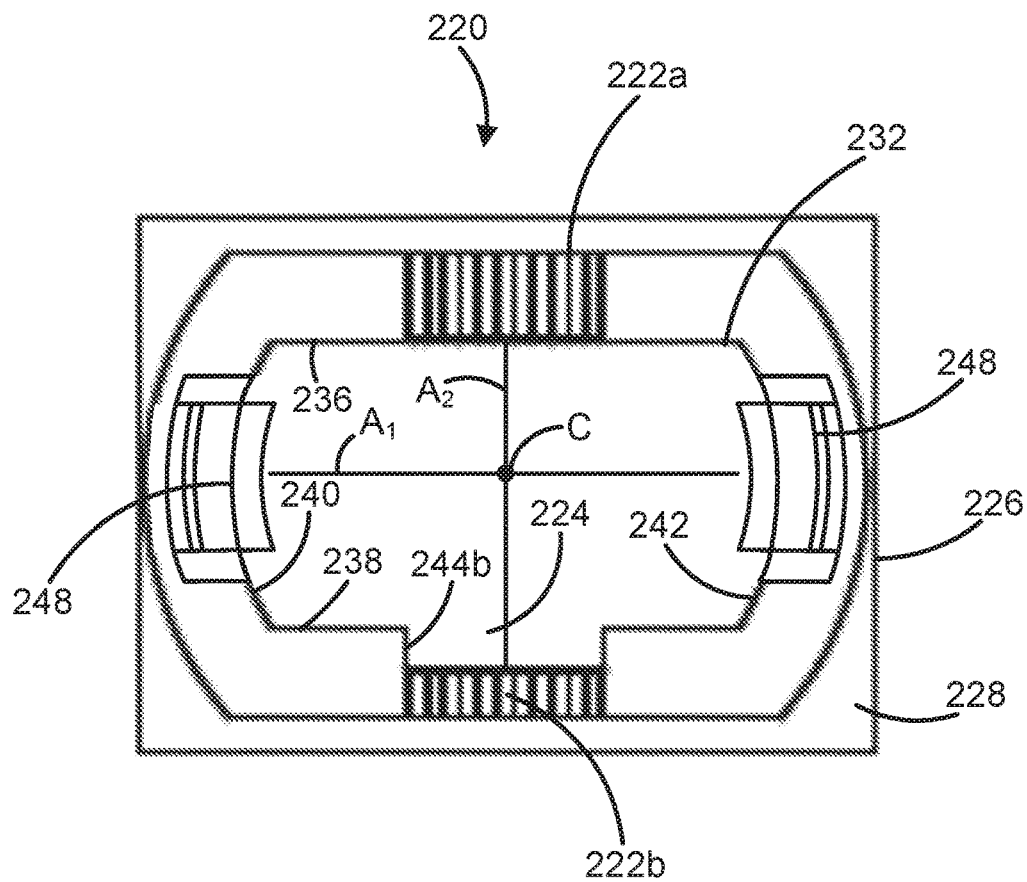
FIG. 19 is an end view of the fiber optic adapter of FIG. 17 showing the front end of the fiber optic connector in a configuration in which an upper keyway of the fiber optic adapter is blocked and a lower keyway of the fiber optic adapter is open.
Figure 20:
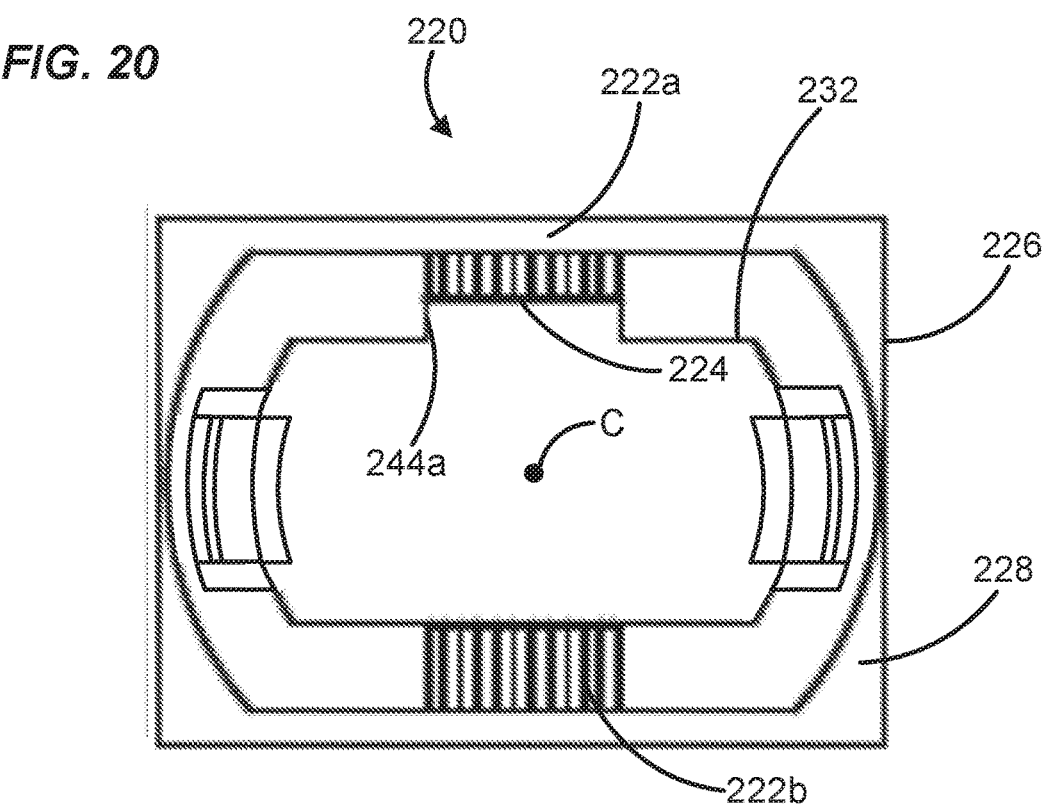
FIG. 20 is another end view of the front end of the fiber optic adapter of FIG. 17 showing the fiber optic adapter in a configuration in which the lower keyway is blocked and the upper keyway is open.

FIGS. 17-20 depict another fiber optic adapter 220 in accordance with the principles of the present disclosure. The fiber optic adapter 220 is configured for coupling together two fiber optic connectors. In one example, the fiber optic adapter 220 is configured for coupling together two multi-fiber fiber optic connectors such as MPO connectors. The fiber optic adapter 220 includes first and second dials 222*a*, 222*b* that can be rotated to different positions to convert the fiber optic adapter 220 between different configurations corresponding to different polarity schemes. For example, FIG. 19 shows the fiber optic adapter 220 in a Type A configuration, while FIG. 20 shows the fiber optic adapter 220 in a Type B configuration. Each of the dials 222*a*, 222*b* defines a keyway 224. Each of the first and second dials 222*a*, 222*b* is rotatable between first and second rotational positions. The keyway 224 is in a key receiving configuration when the dial 222*a*, 222*b* is in the first rotational position. The keyway 224 is in a key non-receiving configuration when the dial 222*a*, 222*b* is in the second rotational position.

The fiber optic adapter 220 includes an adapter body 226 including first and second ends 228, 230. The first end 228 defines a first connector port 232 (see FIGS. 17, 19 and 20) and the second end 230 defines a second connector port 234 (see FIG. 18). The first and second connector ports 232, 234 are aligned along a central axis C that extends between the first and second ends 228, 230 of the adapter body 226 and through the first and second connector ports 232, 234. The first and second connector ports 232, 234 each define an oblong profile shape having perpendicular major and minor axes A1, A2. The oblong profile shape of each of the first and second connector ports 232, 234 includes opposite first and second major sides 236, 238 intersected by the minor axis A2 and first and second minor sides 240, 242 intersected by the major axis A1. The first connector port 232 includes first and second keyways 244a, 244b defined at least in part by the keyways 224 of the first and second dials 222a, 222b. The first and second dials 222a, 222b are aligned along the minor axis A2 of a first connector port 232 and are located respectively at the first and second major sides 236, 238 of the first connector port 232. The second connector port 234 defines a single keyway 246 aligned along the minor axis A2 of the second connector port 234. The single keyway 246 is located at the first major side 242 of the second connector port 234 and is preferably coaxially aligned with the first keyway 244a of the first connector port 232.

The adapter body 226 includes connector retention latches 248 integrated with the adapter body 226 at the first and second connector ports 232, 234. The connector retention latches 248 of each of the first and second connector ports 232, 234 are located respectively at the first and second minor sides 240, 242 of their respective first or second connector port 232, 234 and are aligned along the major axis A1 of their respective first or second connector port 232, 234.

The first and second dials 222a, 222b are rotatably mounted to the adapter body 226 and are positioned adjacent the first connector port 232. The keyways 224 defined by the dials 222a, 222b preferably extend through the dials 222a, 222b along diameters of the dials 222a, 222b. As previously indicated, the dials 222a, 222b are rotatable relative to the adapter body 226 between first and second rotational positions. The keyways 244a, 224b are in the key receiving configuration when their corresponding dial is in the first rotational position and are in a key non-receiving configuration when their corresponding dials are in the second rotational position. Referring to FIG. 19, the first dial 220a is shown in a key non-receiving configuration while the second dial 222b is shown in the key receiving configuration. With the dials configured as shown at FIG. 19, the fiber optic adapter 220 corresponds to a Type A adapter configuration. In FIG. 20, the first dial 222a has been rotated to the key receiving configuration while the second dial 222b has been rotated to the key non-receiving configuration. With the dials 222a, 222b configured as shown at FIG. 20, the fiber optic adapter 220 is configured as a Type B fiber optic adapter.

Figure 17:
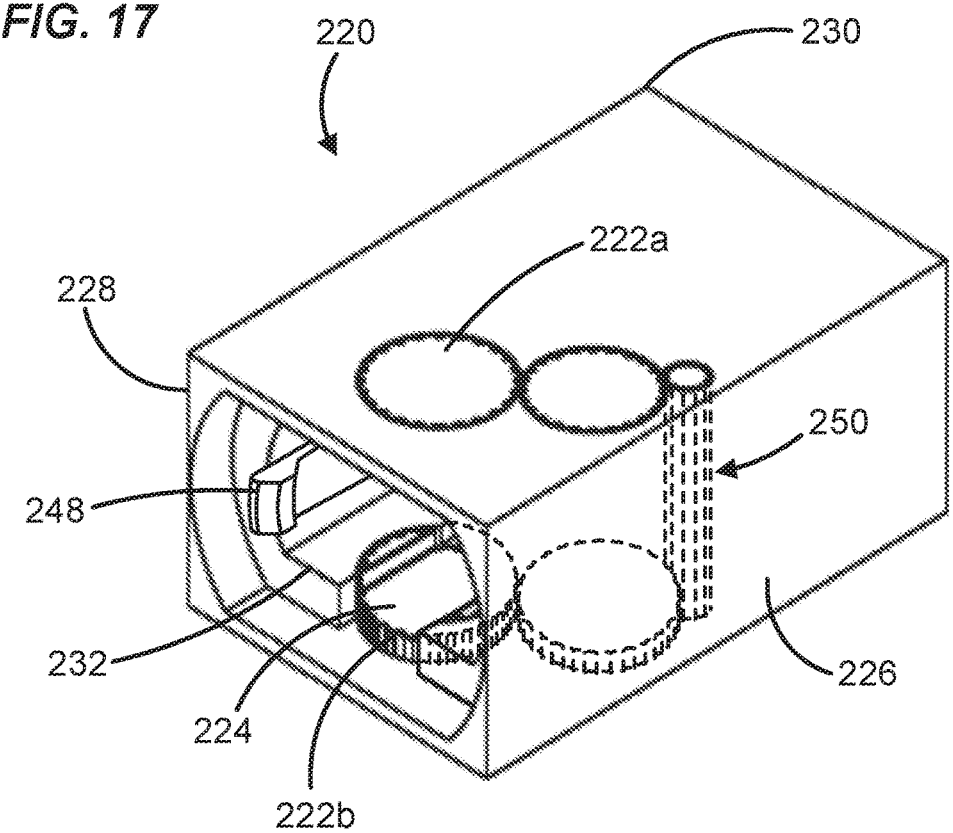
FIG. 17 is a perspective view of another fiber optic adapter in accordance with the principles of the present disclosure, the fiber optic adapter includes dials that can be rotated to change the configuration of the fiber optic adapter to be compatible with different polarity schemes.
Figure 18:
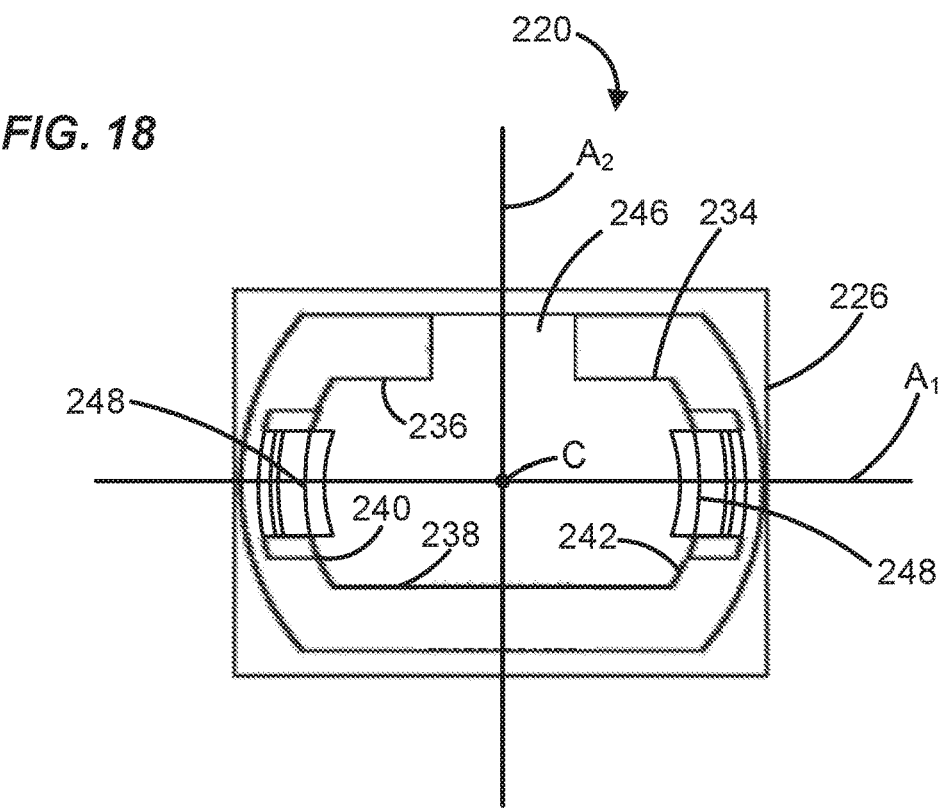
FIG. 18 is an end view of the fiber optic adapter of FIG. 17 showing the rear end of the fiber optic adapter.

In certain examples, the first and second rotational positions between which the dials 222a, 222b are movable are offset from one another by an angle in a range of about 80-100 degrees, or about 90 degrees. In certain examples, the dials 222a, 222b rotate about dial axes that are perpendicular relative to the central axis C. In certain examples, the dials 222a, 222b can be independently or separately rotated between the first and second rotational positions. In other examples, the first and second dials 222a, 222b can be mechanically coupled or linked such that the dials 222a, 222b rotate in unison with one another. For example, coupling between the dials 222a, 222b can be configured such that rotation of one of the dials causes rotation of the other dials in unison with one another. As shown at FIG. 17, a gear arrangement 250 can be used to mechanically couple the dials 222a, 222b together such that torque is transferred between the dials 222a, 222b through the gear arrangement 250.

FIGS. 21-27 depict another fiber optic adapter 320 in accordance with the principles of the present disclosure. The fiber optic adapter 320 is adapted for coupling together two fiber optic connectors. In one example, the fiber optic adapter 320 is adapted for coupling together two multi-fiber fiber optic connectors such as MPO connectors. The fiber optic adapter 320 includes a belt 322 having both first and second keyway blocking portions 322a, 322b. The belt 322 is rotatable between a first position in which the fiber optic adapter 320 is configured as a Type A adapter (see FIG. 24), and a second position in which the fiber optic adapter 320 is configured as a Type B adapter (see FIG. 25).

Figure 26:
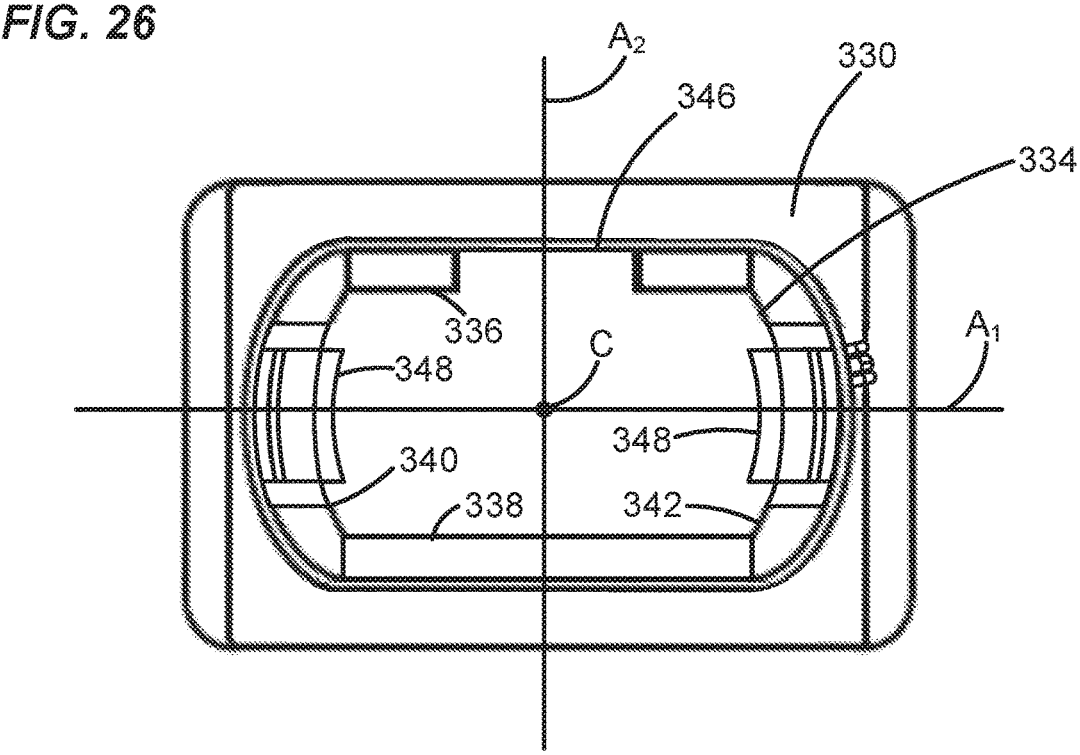
FIG. 26 is an end view showing a rear end of the fiber optic adapter of FIG. 21.

The fiber optic adapter 320 includes an adapter body 326 having a first end 328 and an opposite second end 330. The first end 328 defines a first connector port 332 (see FIGS. 21, 23, and 24) and the second end 330 defines a second connector port 334 (see FIG. 26). The first and second connector ports 332, 334 are aligned along a central axis C that extends between the first and second ends 328, 330 of the adapter body 326 and through the first and second connector ports 332, 334. The first and second connector ports 332, 334 each define an oblong profile shape having perpendicular major and minor axes A1, A2. The oblong profile shape of each of the first and second connector ports 332, 334 have opposite first and second major sides 336, 338 intersected by the minor axis A2 and first and second minor sides 340, 342 intersected by the major axis A1. The first connector port 332 includes first and second keyways 344a, 344b aligned along the minor axis A2 of the first connector port 332. The first and second keyways 344a, 334b are located respectively at the first and second major sides 336, 338 of the first connector port 332. The second connector port 334, as shown at FIG. 26, defines a single keyway 346. The single keyway 346 is aligned along the minor axis A2 of the second connector port 334 and is located at the first major side 336 of the second connector port 334.

The fiber optic adapter 320 further includes connector retention latches 348 integrated with the adapter body 326 at the first and second connector ports 332, 334. Connector retention latches 348 of each of the first and second connector ports 332, 334 are located respectively at the first and second minor sides 340, 342 of each of the respective first and second connector ports 332, 334. The connector retention latches 348 are also aligned along the major axes A1 of each of the connector ports 332, 334.

Figure 24:
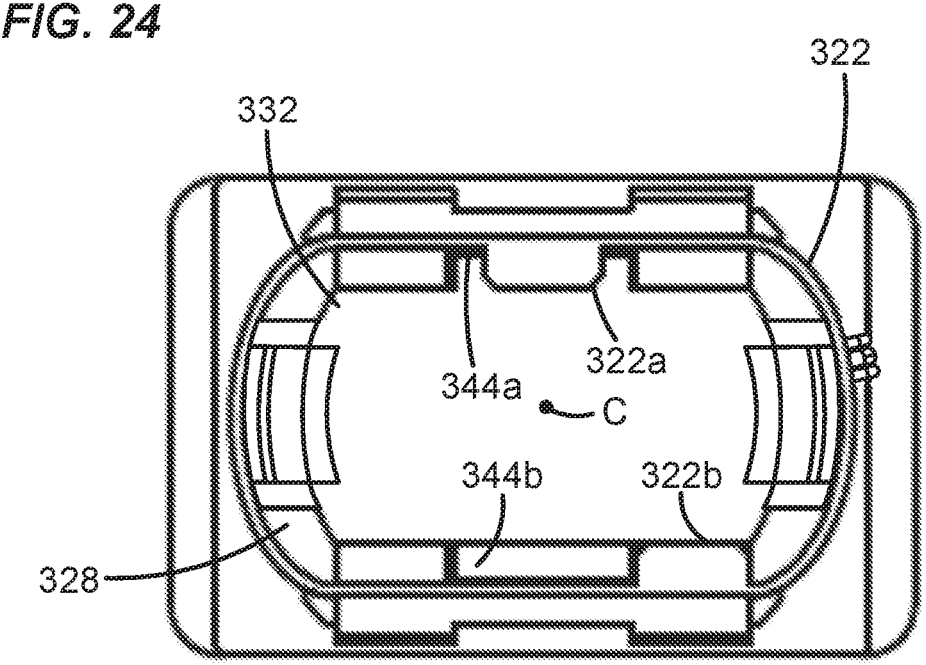
FIG. 24 is an end view depicting the front end of the adapter body of FIG. 23 with the belt mounted thereon and with a blocking portion of the belt blocking an upper keyway of the adapter body.
Figure 25:
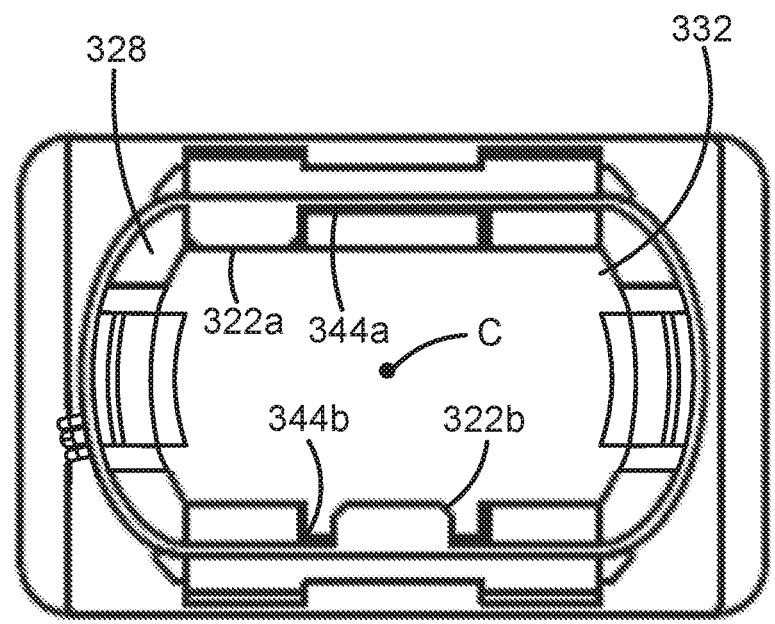
FIG. 25 is another end view showing the front end of the adapter body of FIG. 23 with the belt mounted on the adapter body and with a blocking portion of the belt blocking a lower keyway of the adapter body.

The belt 322 is mounted at the first end 328 of the adapter body 326. The belt 322 is rotatable relative to the adapter body 326 about the central axis C. The belt 322 is rotatably moveable relative to the adapter body 326 about the central axis C between first and second positions. When the belt 322 is in the first position as shown at FIG. 24, the blocking portion 322a at least partially obstructs the first keyway 344a such that the first keyway is in a key non-receiving configuration. Concurrently, the blocking portion 322b is offset from the second keyway 344b such that the second keyway 344b is open and in a key receiving configuration. FIG. 25 shows the belt 322 rotated to the second position. When the belt 322 is in the second position, the blocking portion 322a is offset from the first keyway 344a such that the first keyway 344a is unobstructed and in a key receiving configuration. Concurrently, the blocking portion 322b at least partially obstructs the second keyway 344b such that the second keyway 344b is in a key non-receiving configuration. As indicated previously, when the belt 322 is in the first position, the fiber optic adapter 320 is configured as a Type A adapter, and when the belt 322 is in the second rotational position, the fiber optic adapter 320 is configured in a Type B configuration.

Figure 21:
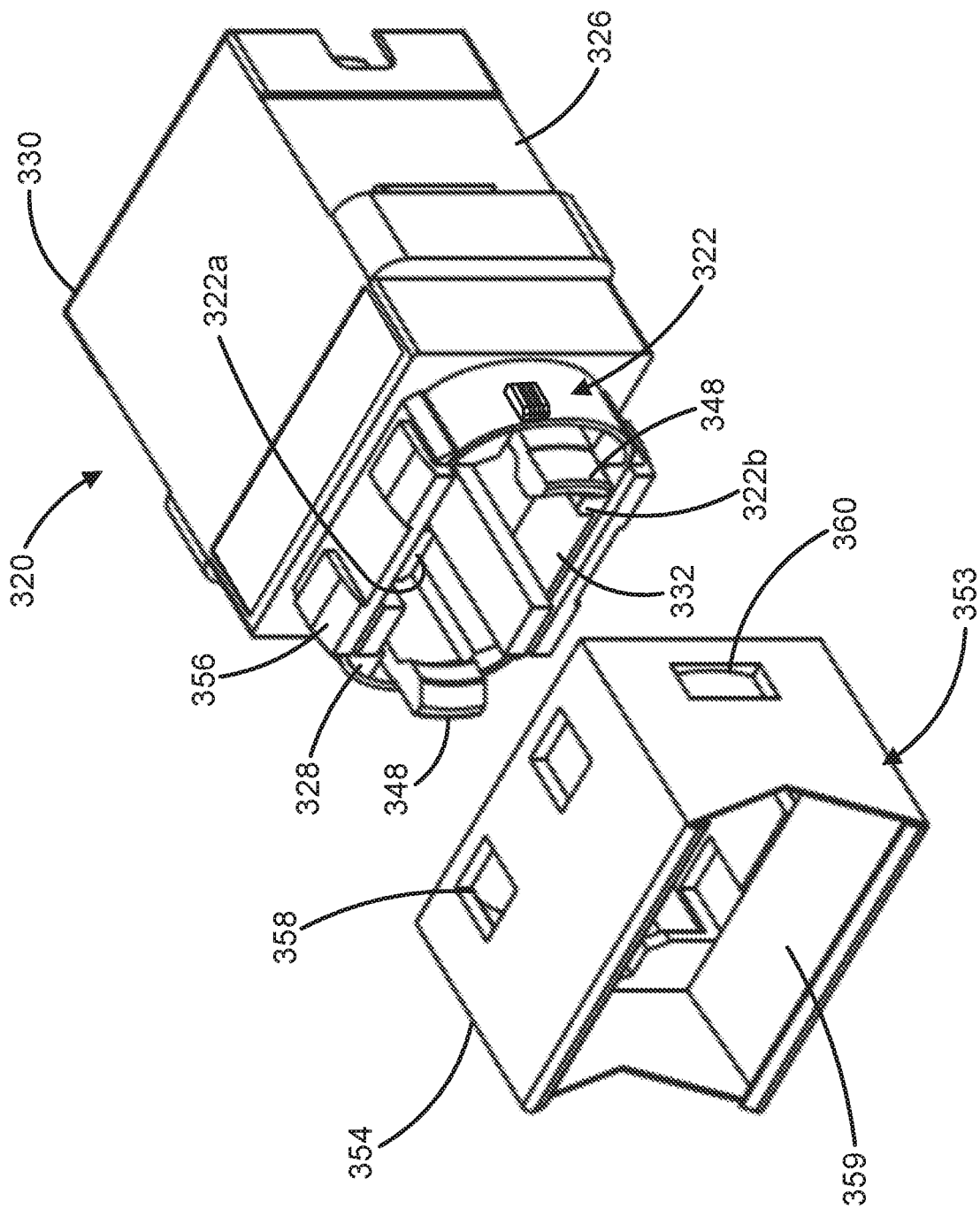
FIG. 21 is a perspective, exploded view of another fiber optic adapter in accordance with the principles of the present disclosure, the fiber optic adapter includes a belt that can be rotated to different positions to convert the fiber optic adapter between different configurations compatible with different polarity schemes.
Figure 22:
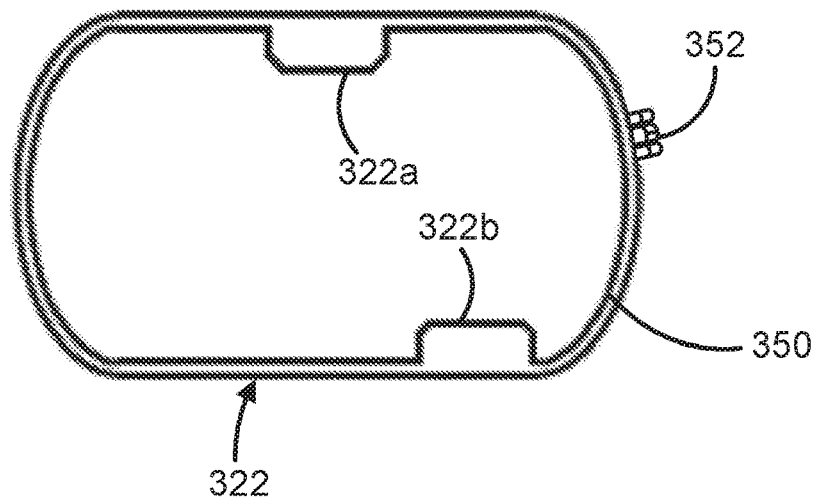
FIG. 22 is an end view showing the belt of the fiber optic adapter of FIG. 21 in isolation from the remainder of the fiber optic adapter.
Figure 23:
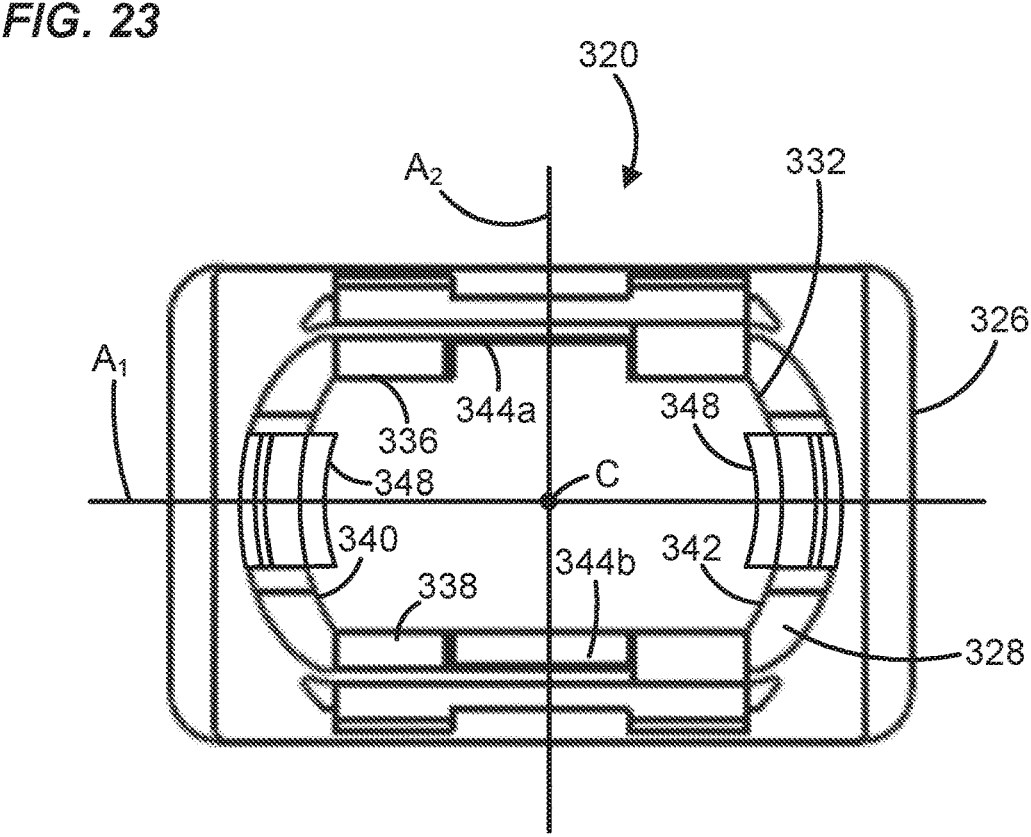
FIG. 23 is an end view of a front end of a fiber optic adapter body of the fiber optic adapter of FIG. 21 with the belt not mounted on the adapter body.
Figure 27:
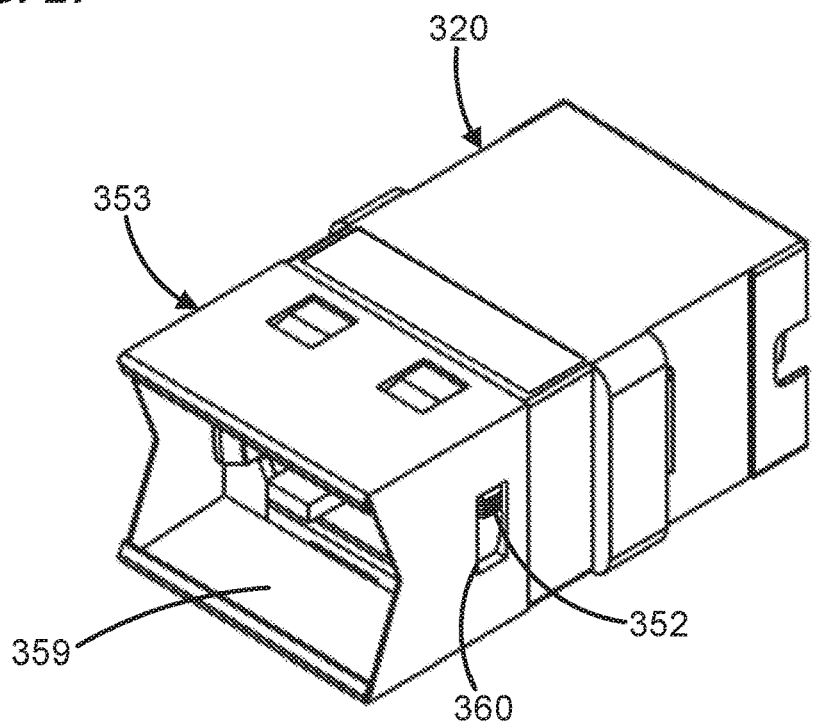
FIG. 27 depicts the fiber optic adapter of FIG. 21 with an end cap including internal shutters mounted over the front end of the adapter body of the fiber optic adapter.

It will be appreciated that as the belt 322 rotates relative to the adapter body 226 about the central axis C, the belt 322 moves along an oblong path. As shown at FIG. 22, the belt 322 includes a main belt body 350 that is a continuous body and that surrounds the central axis C. The blocking portions 322a, 322b are formed by blocking tabs that project inwardly from the main belt body 350. The belt 322 can further include a manipulation tab 352 that projects outwardly from the main belt body 350 for allowing the belt to be manually rotated between the first and second positions. As shown at FIGS. 21 and 27, the fiber optic adapter 320 can further include an end cap 353 having an end cap body 354 that mounts over the first end 328 of the adapter body 326 at a location in which the end cap body 354 is positioned over the belt 322. The end cap can be secured to the adapter body 326 by a mechanical connection such as an interference fit, a snap-fit, a slide latch, fasteners or other techniques. As shown, the adapter body 326 includes flexible latches 356 that snap within receivers 358 defined by the end cap body 354 to secure the end cap body 354 and the adapter body 326 together.

Referring still to FIGS. 21 and 27, the end cap also includes internal shutters 359 pivotally connected to the end cap body 354. The internal shutters 359 are configured to pivot relative to the ends cap body 354 between a closed position and an open position (see FIGS. 21 and 27) in which the shutters 359 are pivoted inside the end cap body 354. It will be appreciated that when a fiber optic connector is inserted into the first connector port 332, contact between the fiber optic connector and the shutters 359 forces the shutters to pivot into the interior of the end cap body 354 from the closed position to the open position to allow the fiber optic connector to be inserted into the first connector port 332.

Referring to FIGS. 21 and 27, the end cap body 354 includes a side slot 360 that receives the manipulation tab 352 of the belt 322 and allows the manipulation tab 352 to be accessed from outside the fiber optic adapter 320 even when the end cap 353 is mounted over the first end 328 of the adapter body 326. By moving the manipulation tab 352 up or down within the side slot 360, the belt 322 can be moved between the first and second positions to change the keying configuration of the fiber optic adapter 320 to be compatible with different polarity schemes.

In certain examples, the internal shutters 359 are coupled to the end cap body 354 by a pivotal, snap-fit connection. In certain examples, the internal shutters 359 are spring biased toward the closed position, and are configured to pivot from the closed position to the open position via contact with a fiber optic connector as the fiber optic connector is inserted into the first port 332. In certain examples, the spring biasing of the shutters 359 can be provided by leaf springs mounted within the end cap body 354.

In certain examples, the internal shutters 359 are configured to pivot relative to the end cap body 354 and the adapter body 326 between a closed position in which the shutters 359 block the first connector port 332 and an open position in which the internal shutters 359 are pivoted inside the end cap body 354 or the adapter body 326 to allow a fiber optic connector to be received within the first connector port 332. The internal shutters 359 are outwardly offset from free ends of the connector retention latches 348 of the first connector port 332 at least when the internal shutters 359 are in the closed position. In certain examples, the internal shutters 359 are obliquely angled relative to the central axis C when in the closed position.

In certain examples, the end cap 353 can include one or more of the key blocking features described herein (e.g., slide blockers, dials, belt with blocking portions, etc.) so as to form the Type A adapter configuration or Type B adapter configuration as required or desired.

Figure 28:
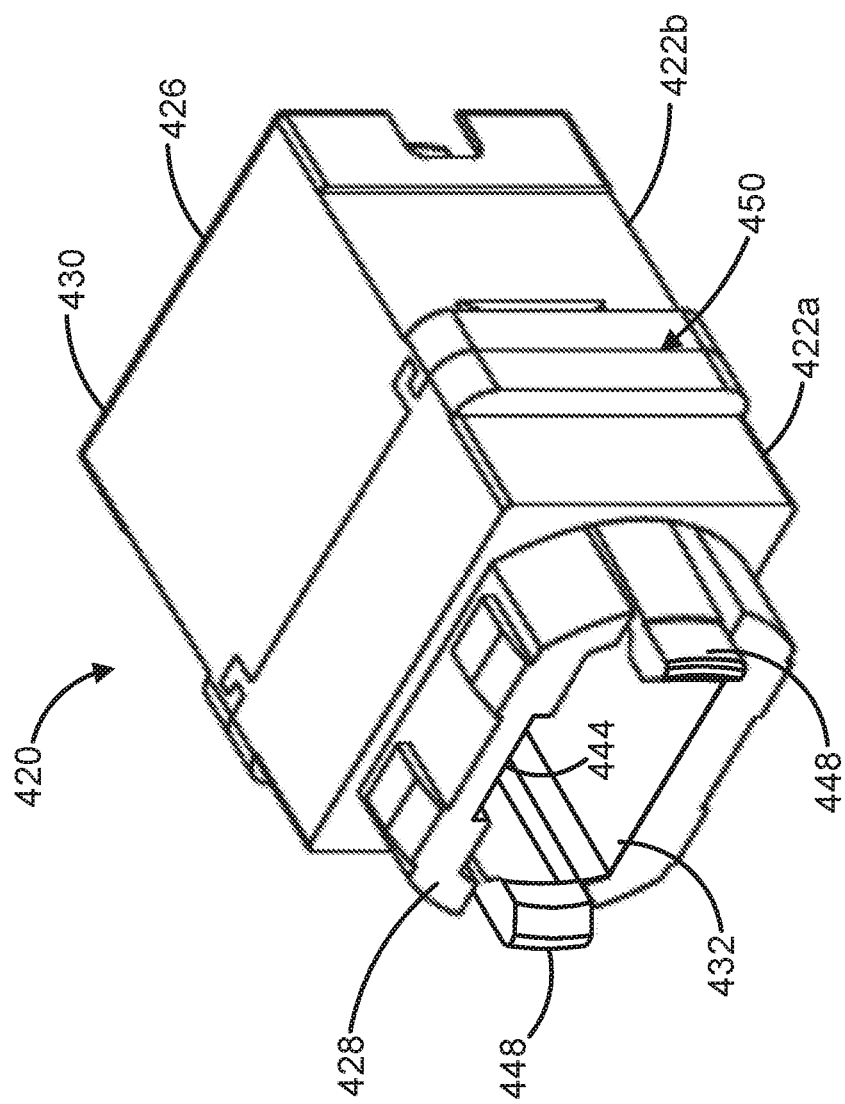
FIG. 28 is a perspective view showing an adapter body of another fiber optic adapter in accordance with the principles of the present disclosure, the adapter body includes separate adapter body portions that can be coupled together in different configurations corresponding to different polarity schemes.
Figure 29:
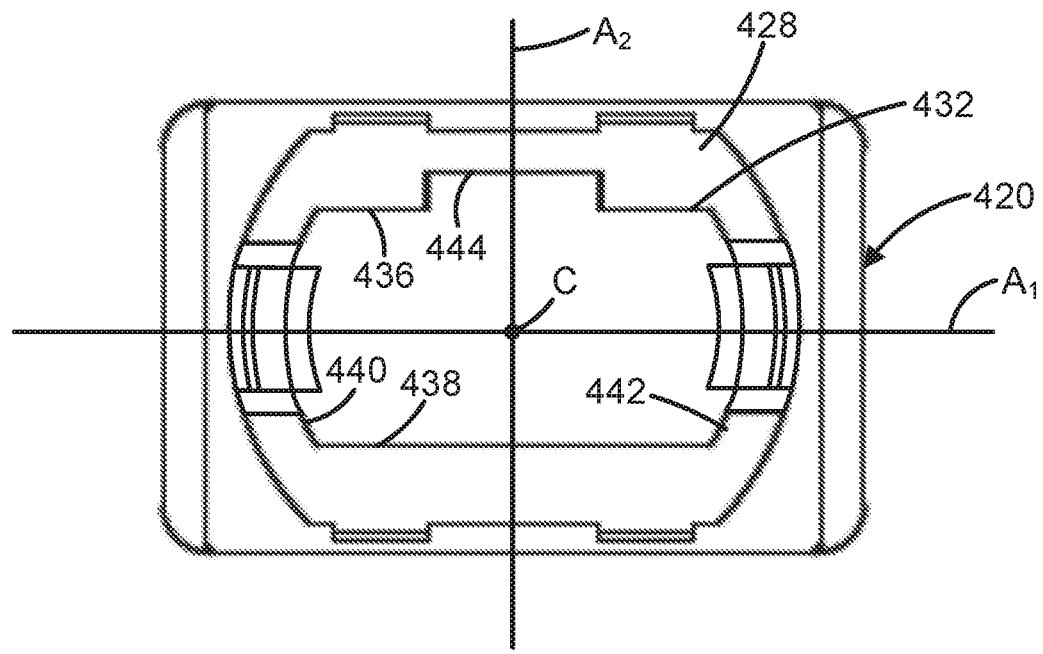
FIG. 29 is an end view showing a front end of the fiber optic adapter body of FIG. 28.
Figure 30:
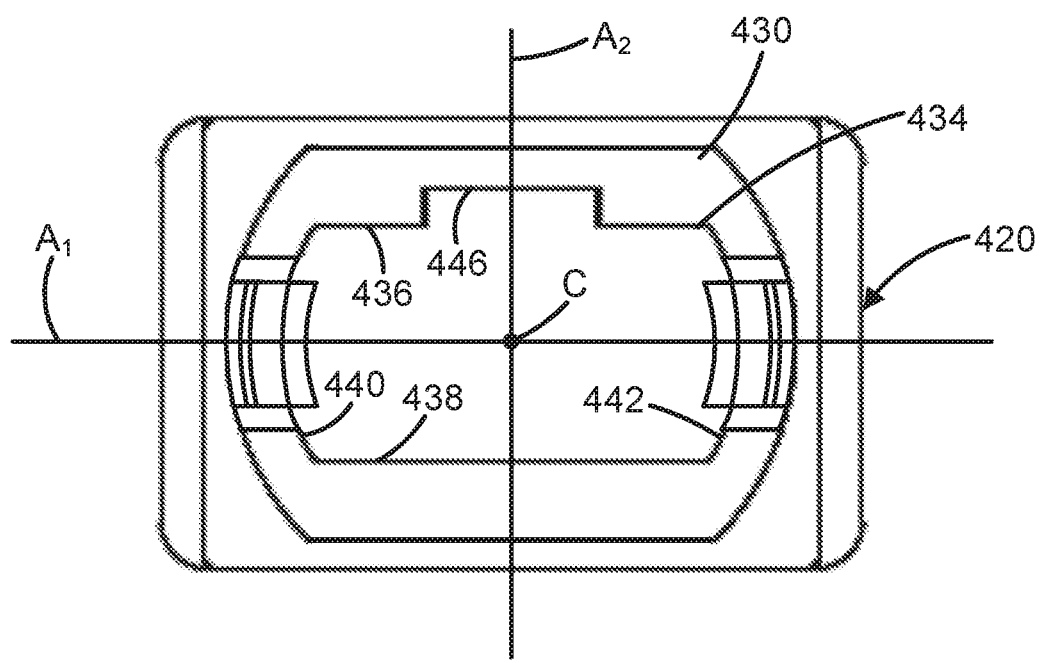
FIG. 30 is an end view showing a rear end of the adapter body of FIG. 28.
Figure 31:
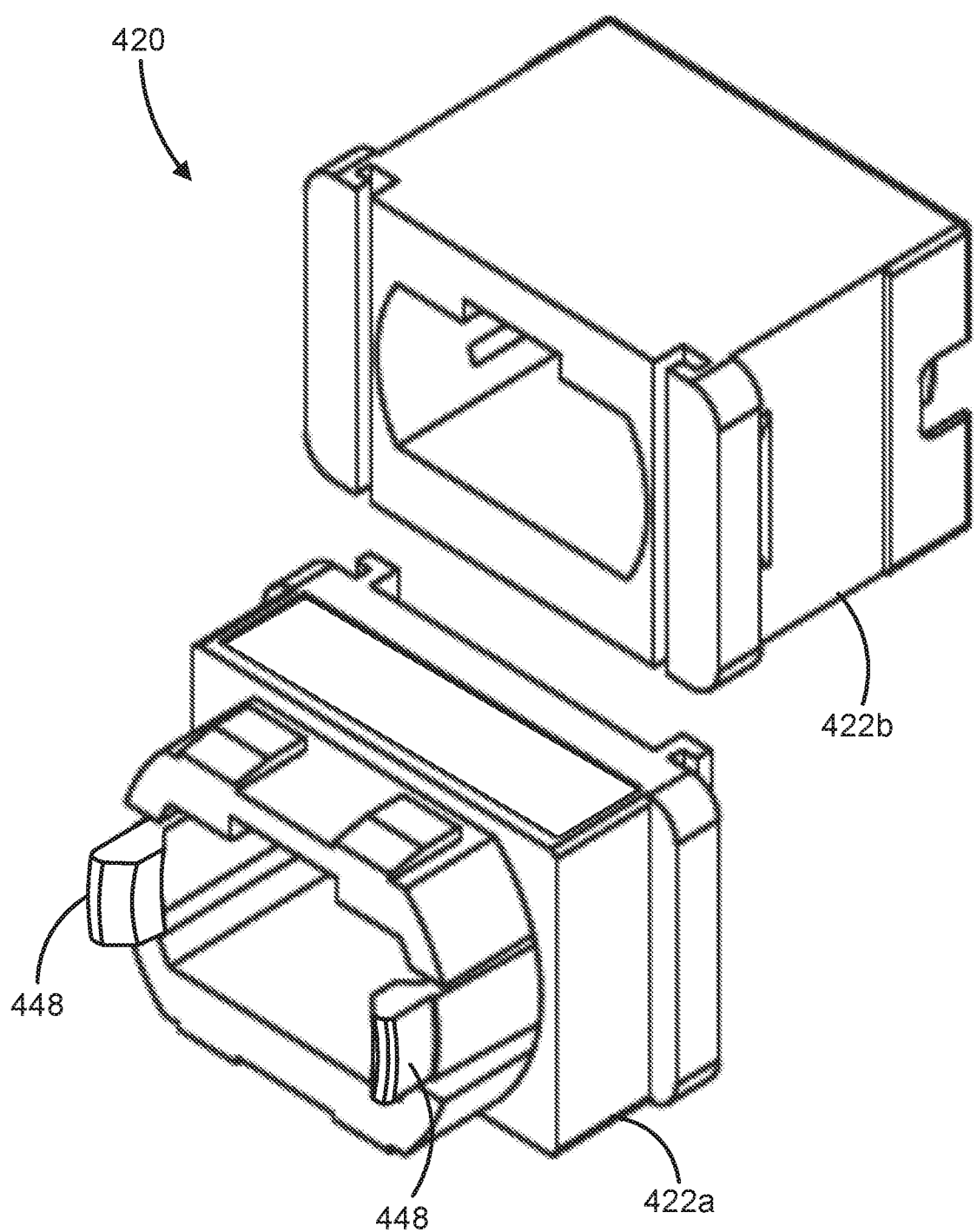
FIG. 31 shows the fiber optic adapter body of FIG. 28 with the separate portions of the adapter body disconnected from one another.
Figure 32:
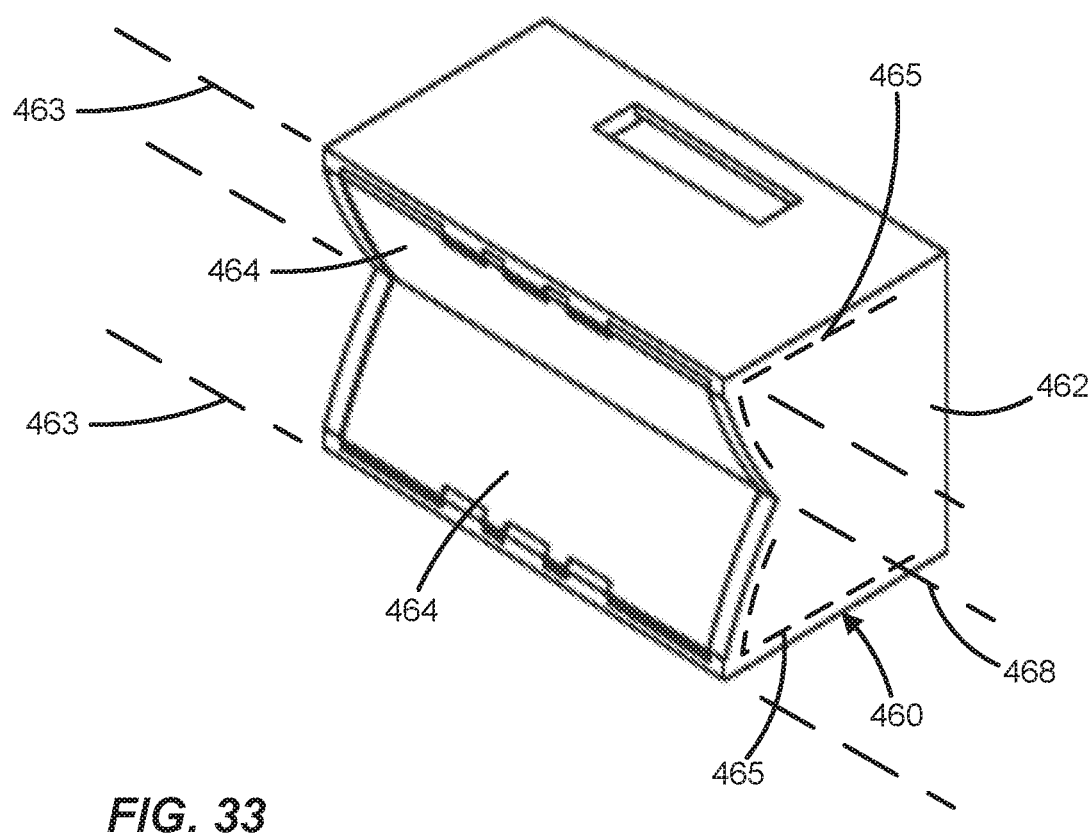
FIG. 32 is a perspective, front view showing an end cap with internal shutters that can be mounted over the front end of the adapter body of FIG. 28.
Figure 33:
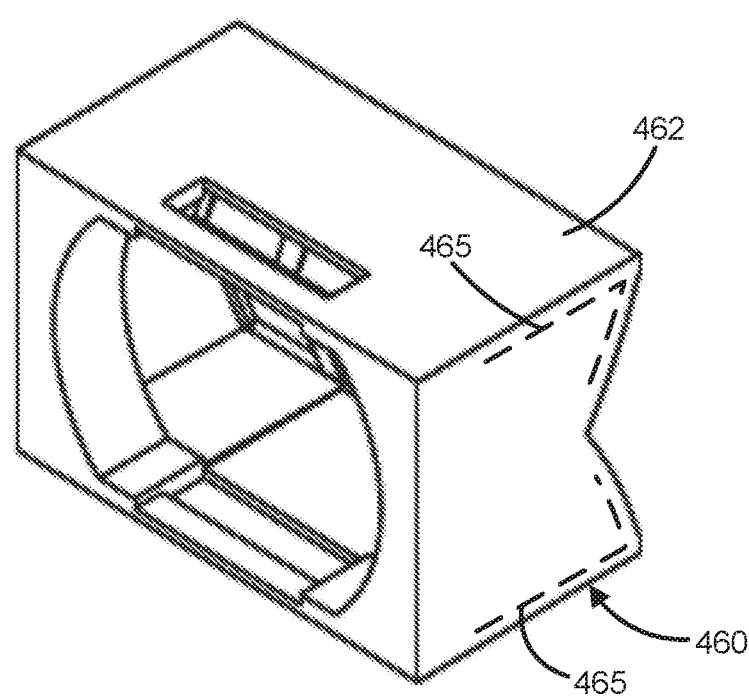
FIG. 33 is a rear, perspective view of the end cap of FIG. 32.
Figure 34:
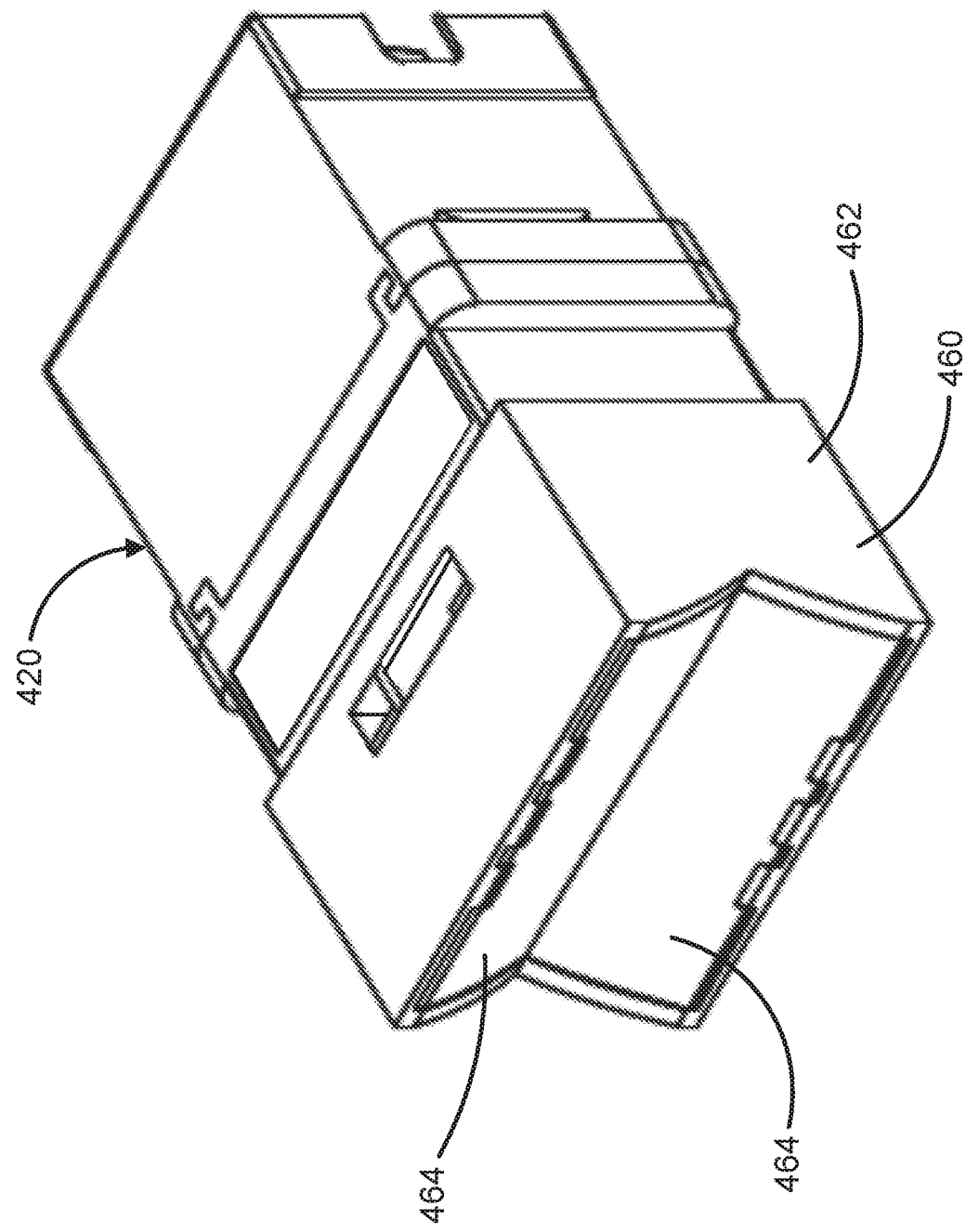
FIG. 34 depicts the adapter body of FIG. 28 with the end cap of FIG. 32 mounted over the front end of the adapter body, internal shutters of the end cap are shown in a closed configuration.
Figure 35:
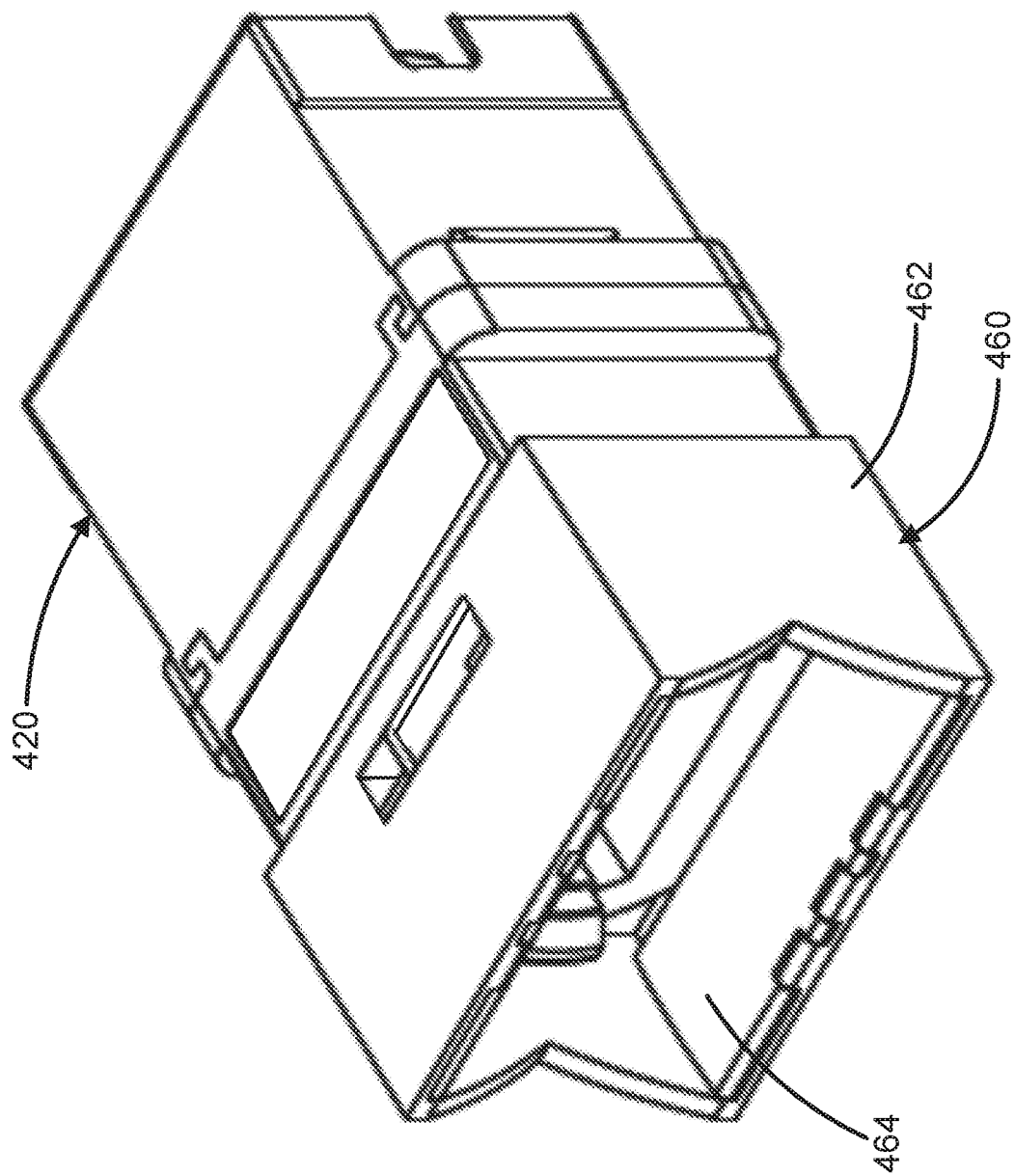
FIG. 35 depicts the fiber optic adapter body and end cap combination of FIG. 34 with the internal shutters of the end cap in an open configuration.

FIGS. 28-35 depict another fiber optic adapter 420 in accordance with the principles of the present disclosure. The fiber optic adapter 420 is adapted for coupling together two fiber optic connectors. In one example, the fiber optic connectors are multi-fiber fiber optic connectors such as MPO connectors. The fiber optic adapter 420 includes first and second adapter body portions 422a, 422b that can be connected together in different configurations to make the fiber optic adapter 420 compatible with different polarity schemes. Referring to FIG. 28, the fiber optic adapter 420 includes an adapter body 426 including first and second ends 428, 430. The first end 428 defines a first connector port 432 and the second end defines a second connector port 434. The first and second connector ports are aligned along a central axis C that extends between the first and second ends 428, 430 of the adapter body 426 and through the first and second connector ports 432, 434. The first and second connector ports 432, 434 each define an oblong profile shape having perpendicular major and minor axes A1, A2. The oblong profile shape of each of the first and second connector ports 432, 434 has opposite first and second major sides 436, 438 intersected by the minor axis A2 and first and second minor sides 440, 442 intersected by the major axis A1. The first connector port 432 includes a single first keyway 444 aligned along the minor axis A2 of the first connector port 432 at one of the first and second major sides 436, 438 of the first connector port 432. The second connector port 434 includes a single second keyway 446 aligned along the minor axis A2 of the second connector port 434 at one of the first and second major sides 436, 438 of the second connector port 434.

The fiber optic adapter 420 also includes connector retention latches 448 integrated with the adapter body 426 at the first and second connector ports 432, 434. The connector retention latches 448 of each of the first and second connector ports 432, 434 are located respectively at the first and second minor sides 440, 442 of their respective first or second connector ports 432, 434 and are aligned along the major axis A1 of their respective first or second connector ports 432, 434.

The adapter body 426 includes the first adapter body portion 422a which defines the first connector port 432 and includes the connector latches 448 corresponding to the first connector port 432. The adapter body 426 also includes the second adapter body portion 422b which defines the second connector port 434 and includes the connector latches 448 corresponding to the second connector port 434. The first adapter body portion 422a includes the single first keyway 444 and the second adapter body portion 422b includes the single second keyway 446. The first and second adapter body portions 422a, 422b are connectable at a mechanical interface 450 that allows the adapter body 426 to be configured in a Type A configuration and also allows the adapter body to be configured in a Type B configuration. When the adapter body is in the Type A configuration, the first and second adapter body portions 422a, 422b are coupled together at a relative orientation in which the single first and second keyways 444, 446 are positioned at opposite sides of their respective ports (e.g., one of the keyways is up and the other of the keyways is down). In contrast, the adapter body 426 is configured in the Type B configuration, the first and second adapter body portions 422a, 422b are coupled together in a configuration in which the single first and second keyways 444, 446 are positioned at the same sides of their respective connector ports 432, 434 (e.g., the keyways 444, 446 are either both up or both down). In a preferred example, the mechanical interface 450 is a tongue and groove configuration. However, other types of configurations such as snap-fit configurations, interference fit configurations and other securement techniques could also be used.

In one example, first and second adapter body portions 422a, 422b each form half-portions of the adapter body 426.

As shown at FIGS. 32-35, an end cap 460 having an end cap body 462 and internal shutters 464 can be mounted over the first end 428 of the adapter body 426. The end cap 460 can be secured to the first end 428 of the adapter body 426 by a snap-fit connection between the end cap body 462 and the first end 428. For example, the first end 428 can include latches, tabs, bumps or other structures that snap within a corresponding receptacle such as a slot defined by the end cap body 462 to secure the end cap 460 to the first end 428 of the adapter body 426. The internal shutters 464 are secured to the end cap body 462 by a pivotal, snap-fit connection are configured to pivot about pivot axes 463. The pivot axes 463 preferably extend parallel to the major axis A1. The internal shutters 464 can be movable between open and closed positions. Springs such as leaf springs 465 can be configured for biasing the internal shutters 464 toward the closed position. In the closed position, the internal shutters 464 can be oriented at an oblique angle relative to the central axis C. In certain examples, the shutters define a V-shaped profile when in the closed position when viewed from the side of the end cap 460. In certain examples, when the internal shutters 464 are closed, the shutters angle toward the first connector port 432 from the hinge axes 463 and meet at a central line 468 that bisects the connector port 432. In certain examples, the internal shutters 464 are configured to pivot from the closed position (see FIGS. 32 and 34) to the open position (See FIG. 35) via contact with a fiber optic connector as the fiber optic connector is inserted into the first connector port 432. In certain examples, the internal shutters 464 are outwardly offset from free ends of the connector retention latches 448 at least when the internal shutters 464 are in a closed position. When the internal shutters 464 are in the closed position, the internal shutters 464 assist in preventing contaminants from entering the first connector port 432 and also provide light blocking ability.

In certain examples, the end cap 460 can include one or more of the key blocking features described herein (e.g., slide blockers, dials, belt with blocking portions, etc.) so as to form the Type A adapter configuration or Type B adapter configuration as required or desired.

Figure 36:
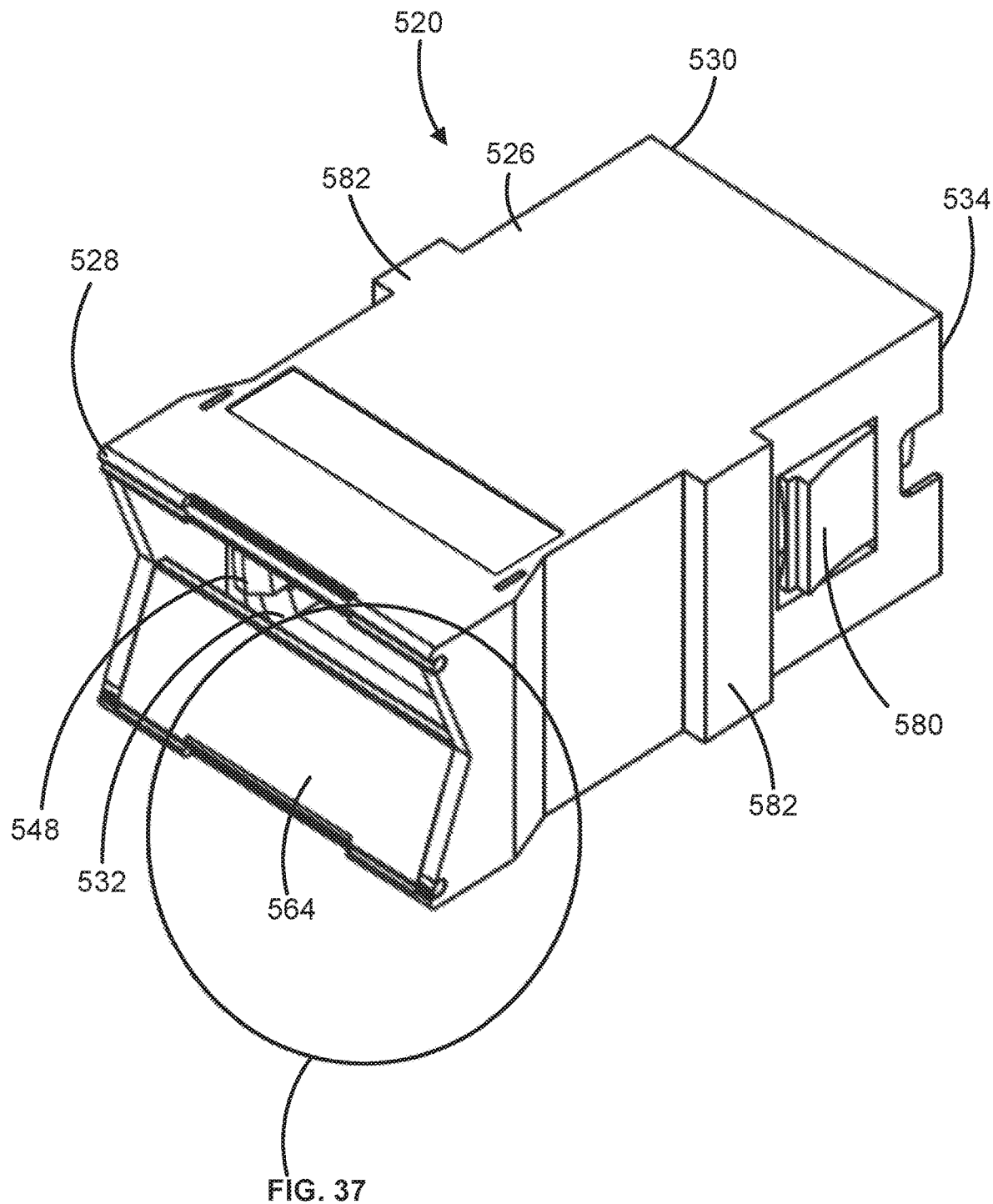
FIG. 36 is a perspective view of another fiber optic adapter in accordance with the principles of the present disclosure, the fiber optic adapter includes internal shutters.
Figure 37:
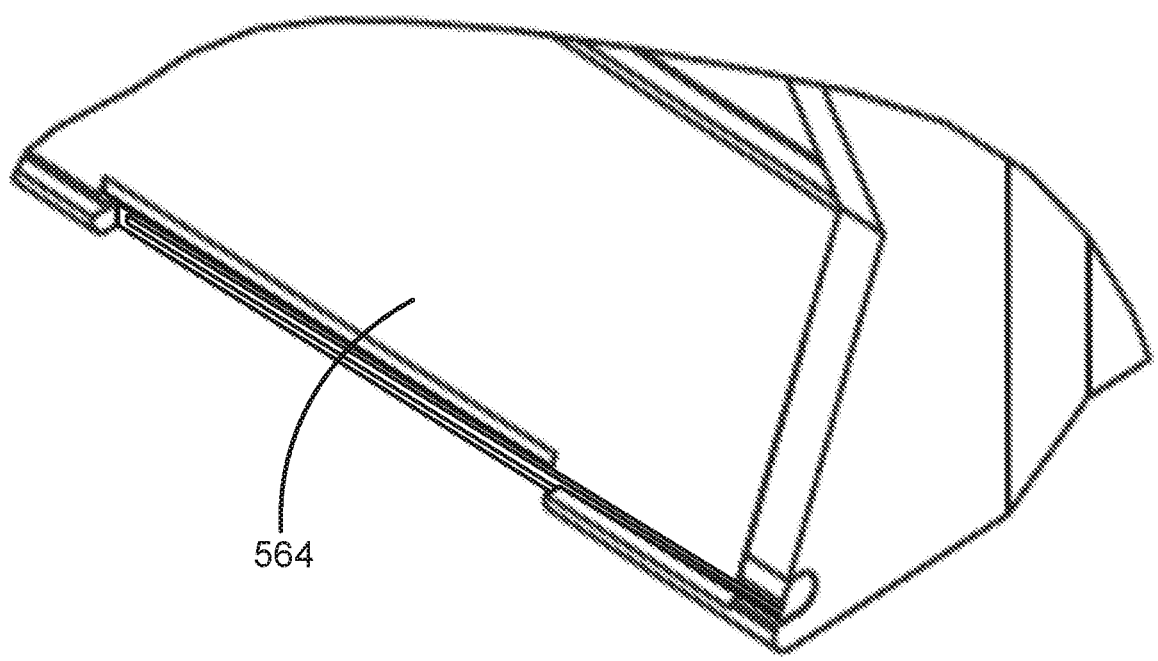
FIG. 37 is an enlarged view of a portion of the fiber optic adapter of FIG. 36.
Figure 38:
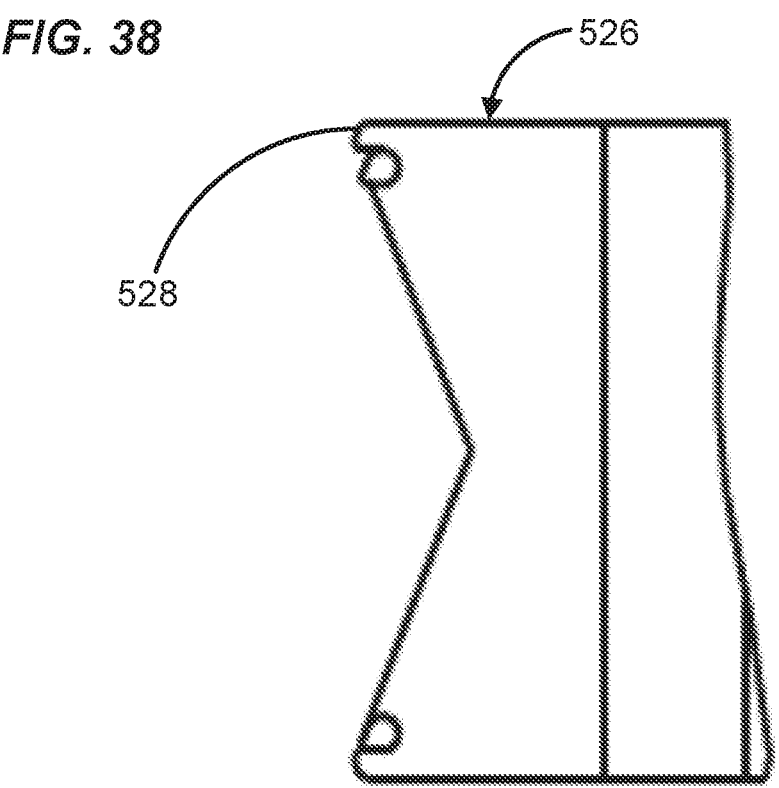
FIG. 38 is a side view of a portion of the fiber optic adapter of FIG. 36.

FIGS. 36-38 show another fiber optic adapter 520 in accordance with the principles of the present disclosure. The fiber optic adapter 520 includes an adapter body 526 having first and second opposite ends 528, 530. The first end 528 defines a first connector port 532 and the second end 530 defines a second connector port 534. Internal shutters 564 of the type previously described are pivotally connected directly to the adapter body 526 adjacent the first connector port 532 via a pivotal snap-fit connection. The shutters 564 can move between open and closed positions in the same manner as described with respect to the other shutters previously described herein. Additionally, the internal shutters 564 are preferably outwardly offset from free ends of connector retention latches 548 corresponding to the first connector port 532 at least when the internal shutters 564 are in the closed position. The adapter body 526 also includes unitarily formed side latches 580 and side flanges 582 that cooperate for allowing the fiber optic adapter 520 to be snapped within an opening of a panel. For example, when the fiber optic adapter 520 is snapped within an opening in a panel, the panel is captured between free ends of the side latches 580 and the side flanges 582. The side latches 580 flex inwardly as the fiber optic adapter 520 is inserted through the opening in the panel, and then snap outwardly to a retaining position once the side latches 580 move through the opening.

Figure 39:
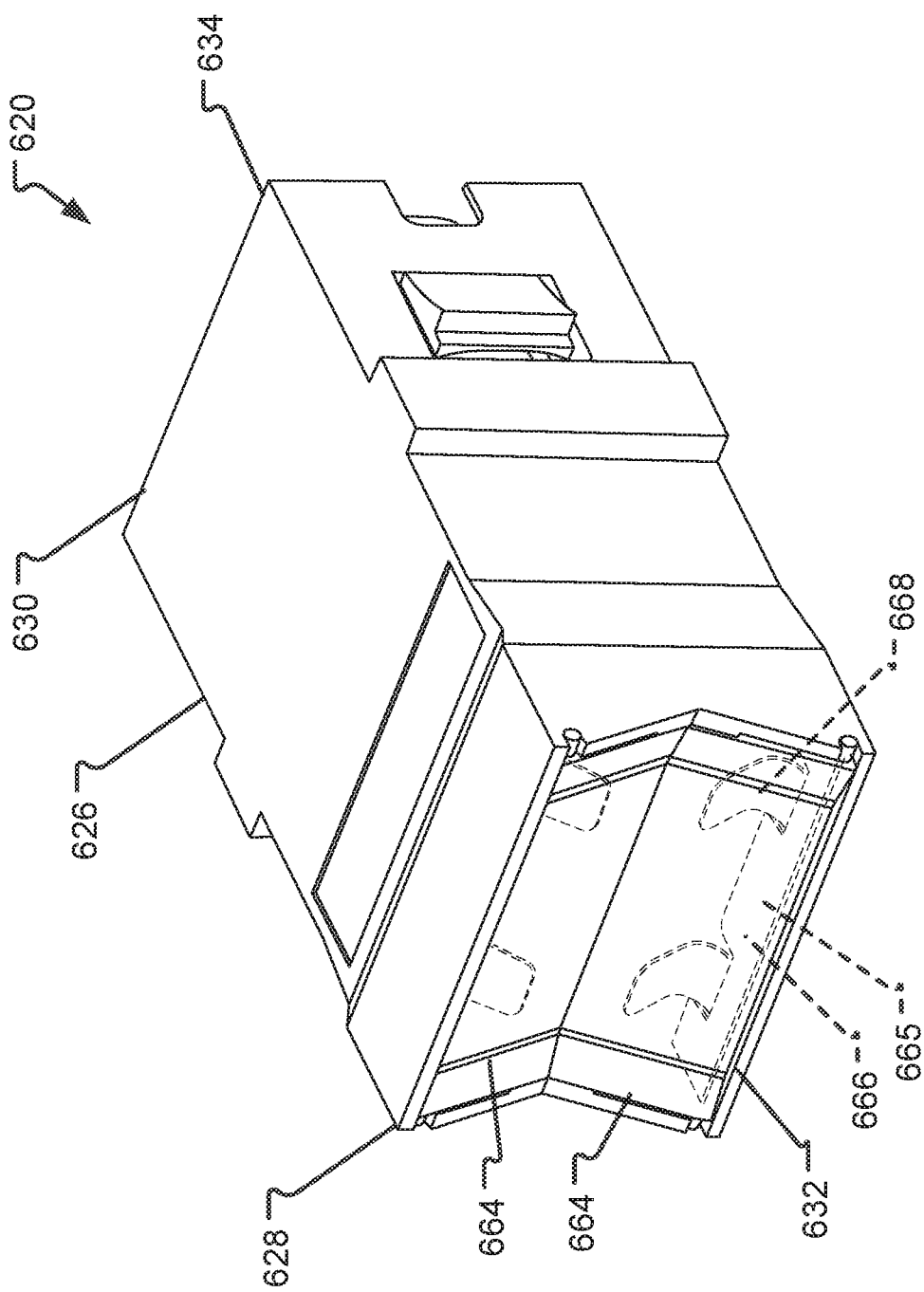
FIG. 39 is a perspective view of another fiber optic adapter in accordance with the principles of the present disclosure, the fiber optic adapter includes internal shutters.
Figure 40:
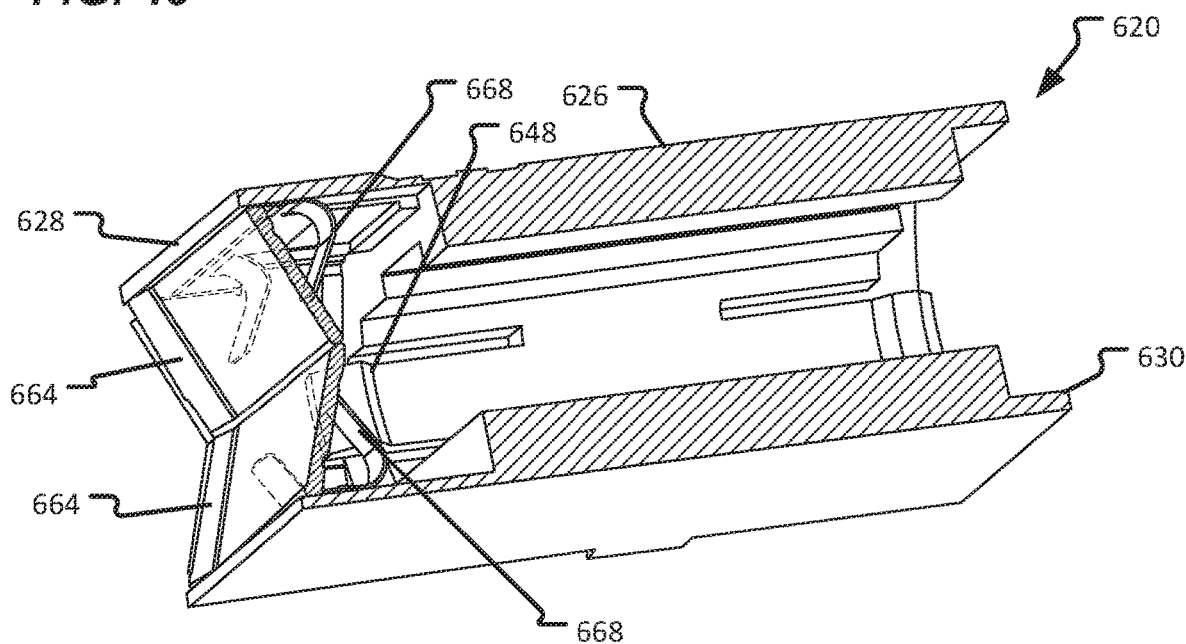
FIG. 40 is a perspective cross-sectional view of the fiber optic adapter of FIG. 39, the internal shutters are shown in a closed configuration.
Figure 41:
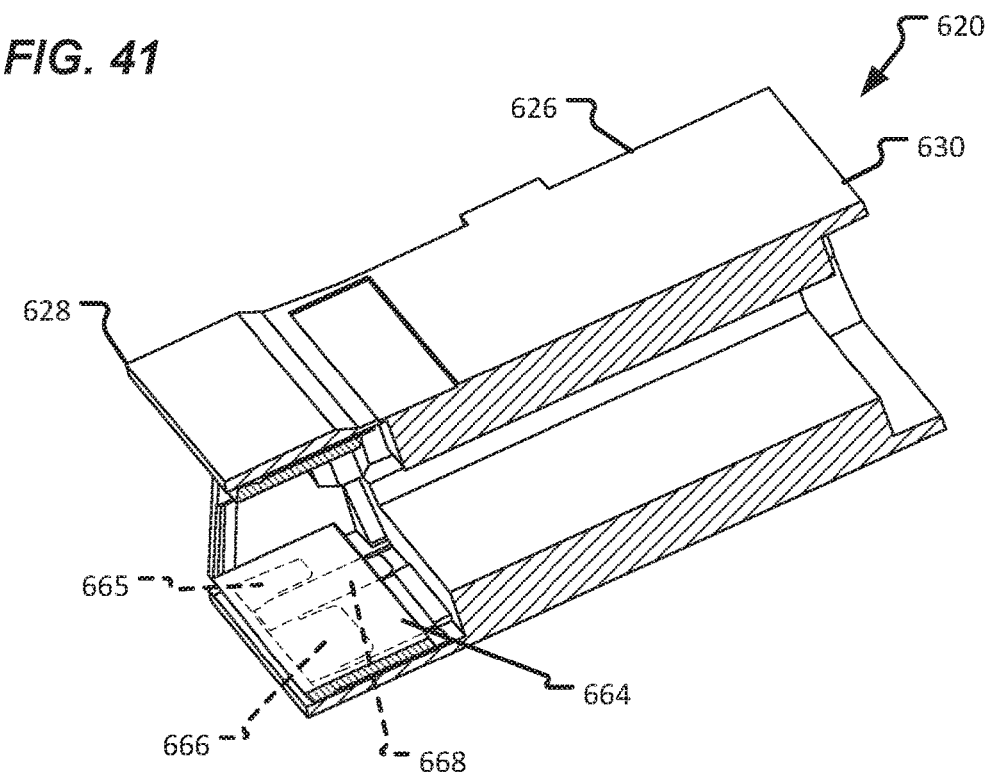
FIG. 41 is a perspective cross-sectional view of the fiber optic adapter of FIG. 39, the internal shutter as shown in an open configuration.

FIGS. 39-41 show another fiber optic adapter 620 in accordance with the principles of the present disclosure. The fiber optic adapter 620 includes an adapter body 626 having first and second opposite ends 628, 630. The first end 628 defines a first connector port 632 and the second end 630 defines a second connector port 634. Internal shutters 664 are secured to the adapter body 626 by a pivotal, snap-fit connection and are configured to pivot about axes that extend parallel to the major axis. The internal shutters 664 are movable between an open configuration (shown in FIG. 41) and a closed configuration (shown in FIG. 40), and are illustrated as transparent so that the components underneath are shown.

A spring 665 biases each internal shutter 664 toward the closed configuration. In certain examples, the spring 665 has a base 666 and one or more resilient arms 668. The base 666 is mounted on an interior surface of the major side, and in some examples, a portion of the base 666 extends at least partially along each minor side. The resilient arms 668 are biased into a curved configuration with a concave surface facing outwards from the first end 628 and a convex surface facing inwards towards the second end 630. A free end of the resilient arm 668 is configured to engage an inner surface of the internal shutter 664 and slide along the surface. This configuration urges the internal shutters 664 into the closed configuration when a fiber optic connector is not present. When a fiber optic connector is inserted into the first connector port 632, the fiber optic connector contacts the internal shutter 664 and overcomes the force of the spring 665, allowing the shutters 664 to pivot and open. In certain examples, when the internal shutters 664 are in the closed configuration, the resilient arms 668 are oriented substantially parallel to the internal shutter 664 and against the interior surface of the major side. In certain examples, the interior surface of the major side can have one or more tracks so that the resilient arms 668 can lay flat within the adapter body 626 in the closed configuration. The internal shutters 664 are offset from free ends of connector retention latches 648.

Figure 42:
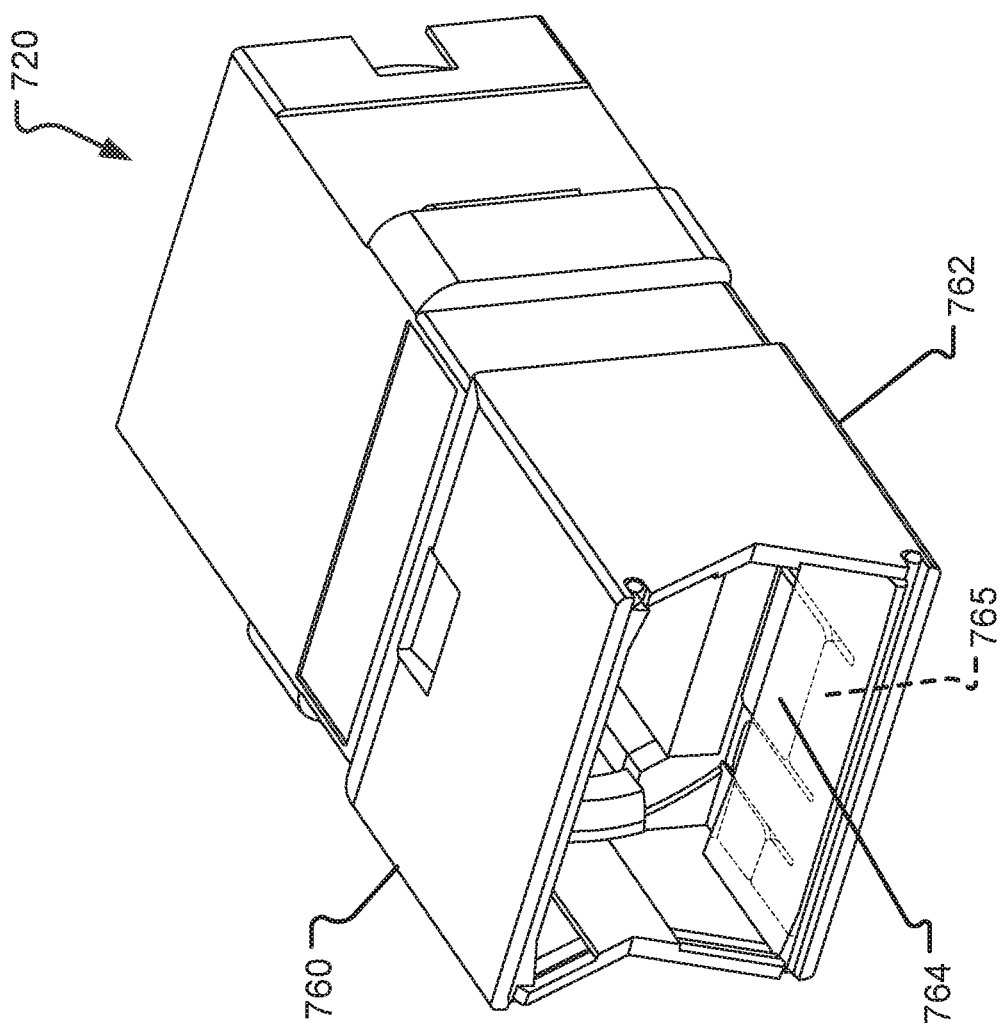
FIG. 42 is a perspective view of another fiber optic adapter in accordance with the principles of the present disclosure with an end cap including internal shutters mounted over the front end of the adapter body of the fiber optic adapter.

FIG. 42 depicts another fiber optic adapter 720 in accordance with the principles of the present disclosure. The fiber optic adapter 720 is adapted for coupling together two fiber optic connectors. Components of the adapter 720 are similar to those described above, and thus, are not necessarily described further. The fiber optic adapter 720 further includes an end cap 760 having an end cap body 762 that mounts over the end of the adapter body. The end cap 760 can be secured to the adapter by a mechanical connection such as an interference fit, a snap-fit, a slide latch, fasteners, or other techniques. The end cap 760 includes internal shutters 764 pivotally connected to the end cap body 762 and configured to move between an open configuration and a closed configuration. The shutters 764 are illustrated as transparent so that the components underneath are shown. As illustrated in FIG. 42, the shutters 764 are in an open configuration. In certain examples, the shutters 764 are biased towards the closed configuration by a spring 765. The spring 765 may have a similar configuration to the spring 665 described above in reference to FIG. 39-41, or may have any other configuration as required or desired. In certain examples, the end cap 760 can include one or more of the key blocking features described herein (e.g., slide blockers, dials, belt with blocking portions, etc.) so as to form the Type A adapter configuration or Type B adapter configuration as required or desired.

A keyway of a connector port is in a key receiving configuration when the keyway is configured to receive a key of a fiber optic connector when the fiber optic connector is inserted in into the connector port while the fiber optic connector is in a rotational orientation in which the key is aligned within the keyway. In this way, when the keyway is in the key-receiving configuration, the fiber optic connector is allowed to be inserted in the connector port while the fiber optic connector is in the rotational positon in which the key is aligned with the keyway. A keyway of a connector port is in a key non-receiving configuration when the keyway is configured to prevent receipt of a key of a fiber optic connector into the keyway when the fiber optic connector is attempted to be inserted in into the connector port while the fiber optic connector is in a rotational orientation in which the key is aligned within the keyway. In this way, when the keyway is in the key non-receiving configuration, the fiber optic connector is prevented from being inserted in the connector port while the fiber optic connector is in the rotational position in which the key is aligned with the keyway.

The various examples described above are provided by way of illustration only and should not be construed to limit the scope of the present disclosure. Those skilled in the art will readily recognize various modifications and changes that may be made without departing from the true spirit and scope of the present disclosure.

What is claimed is:

1. A fiber optic adapter for coupling together two fiber optic connectors, the fiber optic adapter comprising:
   an adapter body including first and second ends, the first end defining a first connector port and the second end defining a second connector port, the first and second connector ports being aligned along an axis that extends between the first and second ends of the adapter body and through the first and second connector ports, the adapter body defining a central axis that extends through the first and second connector ports, the first and second connector ports each defining an oblong shape having perpendicular major and minor axes;
   connector retention latches integrated with the adapter body at the first and second connector ports, the connector retention latches of each of the first and second connector ports being located on opposite sides of their respective first or second connector port and being aligned along the major axis of their respective first or second connector port;
   an end cap having an end cap body that mounts at the first end of the adapter body, the end cap also including internal shutters pivotally connected to the end cap body, the internal shutters being configured to pivot relative to the end cap body between a closed position in which the shutters block the first connector port and an open position in which the shutters are pivoted inside the end cap body to allow a fiber optic connector to be received within the first connector port; and
   wherein the fiber optic adapter is convertible between a type A polarity configuration and a type B polarity configuration, and wherein the internal shutters are secured to the end cap body by a pivotal, snap-fit connection.

2. The fiber optic adapter of claim 1, wherein the internal shutters are spring biased toward the closed position, and are configured to pivot from the closed position to the open position via contact with the fiber optic connector as the fiber optic connector is inserted into the first connector port.

3. The fiber optic adapter of claim 1, wherein the shutters are obliquely angled relative to the central axis when in the closed position.

4. The fiber optic adapter of claim 2, wherein leaf springs mounted within the end cap body biases the internal shutters to the closed position.

5. A fiber optic adapter for coupling together two fiber optic connectors, the fiber optic adapter comprising:
   an adapter body including first and second ends, the first end defining a first connector port and the second end defining a second connector port, the first and second connector ports being aligned along an axis that extends between the first and second ends of the adapter body and through the first and second connector ports, the adapter body defining a central axis that extends through the first and second connector ports, the first and second connector ports each defining an oblong shape having perpendicular major and minor axes;
   connector retention latches integrated with the adapter body at the first and second connector ports, the connector retention latches of each of the first and second connector ports being located on opposite sides of their respective first or second connector port and being aligned along the major axis of their respective first or second connector port;
   an end cap having an end cap body that mounts at the first end of the adapter body, the end cap also including internal shutters pivotally connected to the end cap body, the internal shutters being configured to pivot relative to the end cap body between a closed position in which the shutters block the first connector port and an open position in which the shutters are pivoted inside the end cap body to allow a fiber optic connector to be received within the first connector port; and
   wherein the fiber optic adapter is convertible between a type A polarity configuration and a type B polarity configuration; and
   wherein the shutters are obliquely angled relative to the central axis when in the closed position.

6. The fiber optic adapter of claim 5, wherein the internal shutters are spring biased toward the closed position and are configured to pivot from the closed position to the open position via contact with the fiber optic connector as the fiber optic connector is inserted into the first connector port.

7. The fiber optic adapter of claim 6, wherein leaf springs mounted within the end cap body biases the internal shutters to the closed position.

* * * * *